(12) United States Patent
Kamedula et al.

(10) Patent No.: US 12,491,640 B2
(45) Date of Patent: Dec. 9, 2025

(54) APPARATUS, COMPUTER-IMPLEMENTED METHOD AND COMPUTER PROGRAM FOR ENABLING THE TRACKING OF A ROBOTIC INSTRUMENT TO A PASSIVE CONTROLLER

(71) Applicant: Precision Robotics Limited, London (GB)

(72) Inventors: Malgorzata Kamedula, London (GB); Zhang Lin, Guangdong (CN); Jindong Liu, Isleworth (GB)

(73) Assignee: Precision Robotics Limited, London (GB)

( * ) Notice: Subject to any disclaimer, the term of this patent is extended or adjusted under 35 U.S.C. 154(b) by 162 days.

(21) Appl. No.: 18/286,920

(22) PCT Filed: Apr. 12, 2022

(86) PCT No.: PCT/GB2022/050905
§ 371 (c)(1),
(2) Date: Oct. 13, 2023

(87) PCT Pub. No.: WO2022/219314
PCT Pub. Date: Oct. 20, 2022

(65) Prior Publication Data
US 2024/0383144 A1 Nov. 21, 2024

(30) Foreign Application Priority Data
Apr. 14, 2021 (GB) ...................................... 2105285

(51) Int. Cl.
*B25J 9/16* (2006.01)
*A61B 34/32* (2016.01)

(52) U.S. Cl.
CPC ............. *B25J 9/1689* (2013.01); *A61B 34/32* (2016.02); *B25J 9/1607* (2013.01); *B25J 9/1664* (2013.01)

(58) Field of Classification Search
CPC ...... B25J 9/1689; B25J 9/1607; B25J 9/1664; B25J 9/1615; B25J 3/00; A61B 34/32;
(Continued)

(56) References Cited

U.S. PATENT DOCUMENTS 8,376,934 B2  2/2013  Takahashi et al.
9,931,172 B2  4/2018  Hourtash et al.
(Continued)

FOREIGN PATENT DOCUMENTS

EP    3025672 A1    6/2016
WO    2020185789 A1    9/2020

OTHER PUBLICATIONS

Starke.pdf (Sebastian Starke, Norman Hendrich, Dennis Krupke, Jianwei Zhang, Evolutionary Multi-Objective Inverse Kinematics on Highly Articulated and Humanoid Robots, 2017, IEEE, pp. 6959-6966) (Year: 2017).*
(Continued)

*Primary Examiner* — Bao Long T Nguyen
(74) *Attorney, Agent, or Firm* — Budzyn IP Law, LLC

(57) ABSTRACT

An apparatus including computer program code configured to cause the apparatus to: receive a command defining a desired pose of an end effector of a robotic instrument; determine, based on the command, joint parameters for each joint of the robotic instrument using an inverse kinematics algorithm to enable the end effector to mimic the desired pose as closely as possible, wherein the algorithm is configured to reiteratively calculate a pose of the end effector and identify the calculated pose with the smallest tracking error as a global solution if the tracking error is smaller than (Continued)

that associated with a current pose of the end effector, otherwise identify the current pose as the global solution; and wherein the apparatus is configured to generate a motor command to reconfigure the joints according to the global solution if the calculated pose with the smallest tracking error is identified as the global solution.

18 Claims, 11 Drawing Sheets

(58) Field of Classification Search
CPC ... A61B 34/74; A61B 2034/306; A61B 34/37; A61B 34/35; A61B 34/77; G05B 2219/39079; G05B 2219/39457
See application file for complete search history.

(56) References Cited

U.S. PATENT DOCUMENTS 9,981,386 B2     5/2018    Komuro et al.
2021/0378769 A1*   12/2021   Zhou ..................... B25J 9/1689

OTHER PUBLICATIONS

Starke et al.: "Evolutionary Multi-Objective Inverse Kinematics on Highly Articulated and Humanoid Robots", 2017 IEEE/RJS International Conference on Intelligent Robots and Systems (IROS), IEEE, Sep. 24, 2017, pp. 6959-6966, XP033266771, DOI: 10.1109/IROS.2017.8206620.

Rakita et al.: "A Motion Retargeting Method for Effective Mimicry-based Teleoperation of Robot Arms", Human-Robot Interaction, ACM, New York, USA, Mar. 6, 2017, pp. 361-370, XP058316719, DOI: 10.1145/2909824.3020254, ISBN: 978-1-4503-4336-7.

Rakita et al.: "An Analysis of RelaxedIK: an optimization-based framework for generating accurate and feasible robot arm motions", Autonomous Robots, Kluwer Academic Publishers, Dordrecht, NL, vol. 44, No. 7, Aug. 3, 2020, pp. 1341-1358, XP058316719, DOI:10.1007/S10514-020-09918-9, ISSN:0929-5593.

Beeson et al.: "TRACK-IK: An Open-Source Library for Improved Solving of Generic Inverse Kinematics", 2015 IEEE-RAS 15th International Conference on Humanoid Robots (Humanoids), Nov. 1, 2015, pp. 928-935, XP055920735, DOI: 10.1109/HUMANOIDS.2015.7363472, ISBN: 978-1-4799-6885-5.

International Search and Written Opinion Report from PCT International Application No. PCT/GB2022/050905, dated Nov. 2, 2022.

Search and Examination Report from U.K. Application No. GB2105285.7, dated Sep. 23, 2021.

* cited by examiner

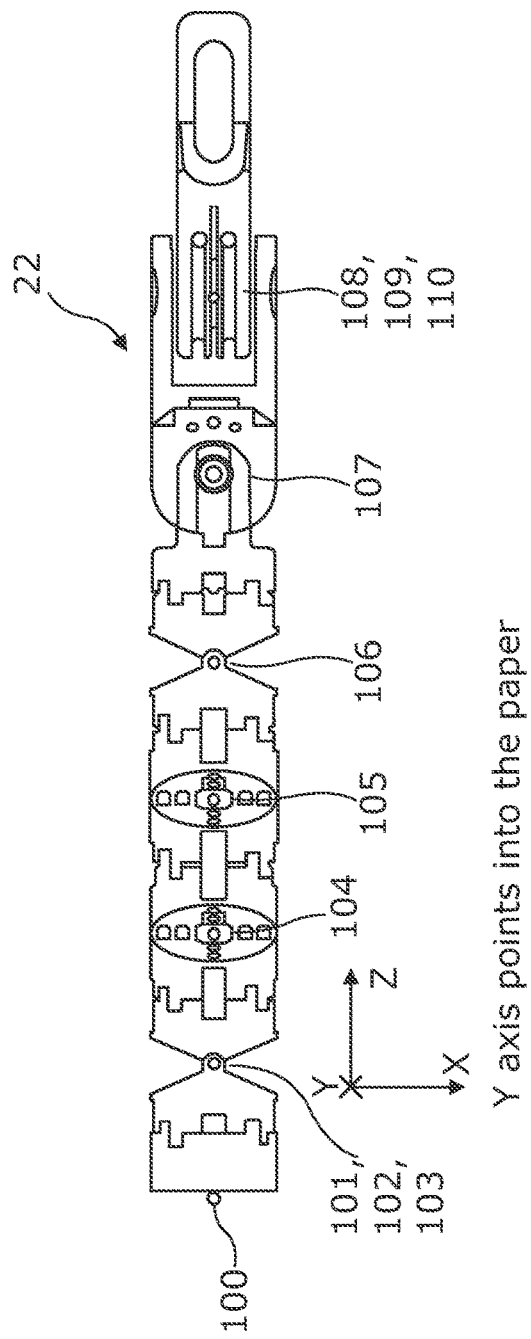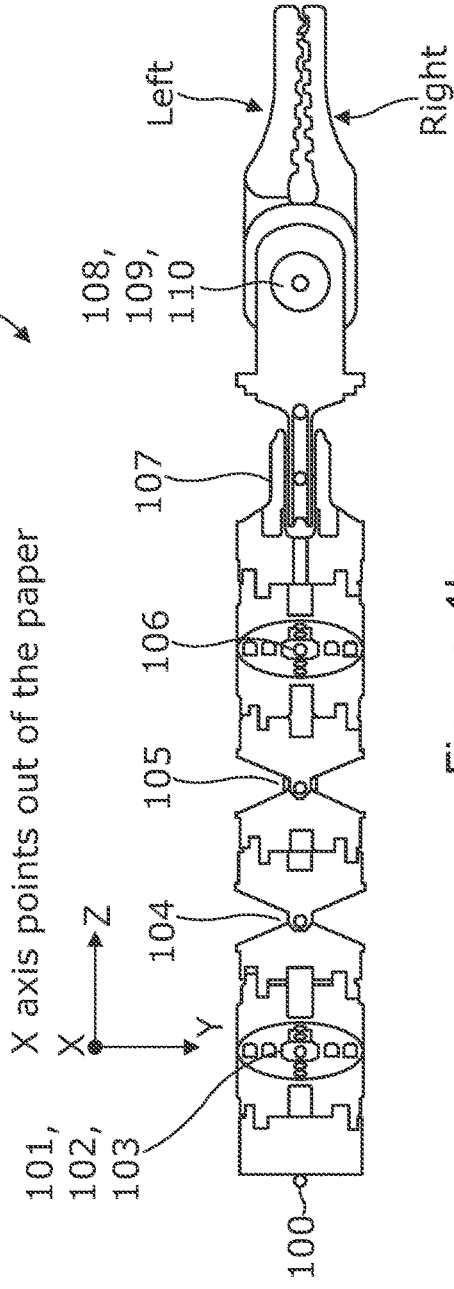
Figure 4a
Figure 4b

APPARATUS, COMPUTER-IMPLEMENTED METHOD AND COMPUTER PROGRAM FOR ENABLING THE TRACKING OF A ROBOTIC INSTRUMENT TO A PASSIVE CONTROLLER

CROSS-REFERENCE TO RELATED APPLICATIONS

This Application is a National Stage Application under 35 U.S.C. § 371 of PCT Application No. PCT/GB2022/050905, filed Apr. 12, 2022 which claims priority to UK Patent Application No. GB2105285.7, filed Apr. 14, 2021, the entire contents of which are incorporated by reference herein.

TECHNICAL FIELD

The invention relates generally to remotely controlled robotic systems and, in particular, an apparatus, associated method and computer program for enabling the tracking of a robotic instrument to a passive controller.

BACKGROUND

Remotely controlled robotic systems have use in a variety of applications, particularly applications in which a human's access, safety or both are limited. For example, remotely controlled robotic systems are used in minimally invasive surgeries in which access to the site to be operated on is limited to natural cavities and/or small incisions. A human's hands are too large to access such areas and therefore small robots may be used instead which are controlled remotely by a surgeon. Remote controlled robotic systems are also used in military applications such as bomb disposal where a robot may be operated remotely from a safe distance.

From herein the invention is primarily described in relation to surgical robotic systems. However, this is for demonstrative purposes only and is not to the exclusion of the invention's application in other fields.

Known remotely controlled surgical robotics systems comprise a controller and a robotic instrument wherein a user may issue commands to the robotic instrument by manipulating the controller. Known controllers comprise a base, an articulatable arm coupled to the base and comprising a plurality of joints (e.g. rotatable joints or prismatic joints), and a handle coupled to the articulatable arm and movable relative to the base through motion of the joints. Known robotic instruments comprise a base, an actuatable arm coupled to the base and comprising a plurality of joints, and an end effector coupled to the actuatable arm and actuatable relative to the base through motion of the joints.

The controller and the robotic instrument, particularly the handle and end effector respectively, each have freedom of movement within respective control and instrument workspaces. Further, the handle and end effector may each have six degrees of freedom of movement in its respective workspace including translational movement along three axes and rotational movement about three axes. The handle and end effector may be considered as having a position in the respective workspace dependent upon translational movement and an orientation relative to the respective workspace dependent upon rotational movement. Further, the position and orientation of the handle or end effector may be considered, in combination, as the pose handle or end effector.

A user may manipulate the position and orientation of the handle within the controller workspace and the manipulations may be tracked via measurement of the motion of each joint in the articulatable arm. The manipulations may be converted to commands for the robotic instrument, particularly the joints of the actuatable arm, to actuate so that the position and orientation of the end effector moves in the instrument workspace correspondingly to the manipulations of the handle in the controller workspace.

Known controllers are active controllers meaning that, when the robotic system is in use, torque required to rotate each joint in the controller is actively varied depending on input from a user. For example, if the user were to let go of the controller, torque in each of the joints may be varied so that the handle is held in the last position and orientation that the user manipulated it to. In other words, the controller freezes unless the user provides further input. By extension, the robotic instrument freezes also.

Further, in instances where movement of the robotic instrument is limited by its available workspace, then a corresponding limitation may be enforced on the controller by limiting the rotation of joints beyond a certain point for example. This prevents the controller from ever becoming misaligned from the robotic instrument.

However, actively varying the torque of each joint in the controller requires the controller to comprise expensive and bulky components such as servo motors. Known active controllers are therefore expensive to manufacture and lack portability. Further, the active variation of torque in joints of the controller can encourage the user towards unwanted and/or unnatural positions which may frustrate the user or cause errors to be made.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect of the invention, there is provided an apparatus comprising: at least one processor; and at least one memory including computer program code, the at least one memory and computer program code configured to, with the at least one processor, cause the apparatus to: receive a control command from a passive controller, the passive controller configured to remotely control a robotic instrument having a plurality of joints and an end effector, the control command defining a desired pose of the end effector; determine, based on the control command, joint parameters for each of the plurality of joints using an inverse kinematics (IK) algorithm to enable the end effector to mimic the desired pose as closely as possible within a constrained environment, wherein the IK algorithm is configured to: calculate a pose of the end effector using a first set of joint parameters as an initial condition; compare the calculated pose with the desired pose to determine a tracking error; reiterate the calculating and comparing steps for one or more different sets of joint parameters; and identify the calculated pose with the smallest tracking error as a global solution only if the tracking error is smaller than that associated with a current pose of the end effector, otherwise identify the current pose as the global solution; and wherein the apparatus is further configured to generate a motor command to reconfigure the plurality of joints according to the set of joint parameters associated with the global solution if the calculated pose with the smallest tracking error is identified as the global solution.

The passive controller is a controller comprising joints which are freely moveable with no active variation of the torque required to move the joints as there is in active controllers. A passive controller may be cheaper to manufacture, smaller and lighter than an active controller by virtue of not requiring expensive, heavy and or bulky components such as servo motors. Further, as there is no active variation of joint torque, there is no biasing of the user's movements towards uncomfortable or unnatural positions or poses that may result in sub-optimal or unintended commands being transmitted to the associated robotic instrument.

However, as the user of the passive controller is free to manipulate the passive controller with no artificial restriction, it is possible that the passive controller is moved to a pose (position and orientation) which the associated robotic instrument is unable to mimic exactly. For example, robotic instrument may be limited to movement within a constrained environment based on the shape and joint configuration of the robotic instrument, and the passive controller may be moved to a pose which the robotic instrument is not able to replicate within the limits of the constrained environment. This may be due to differences in the shape and configuration between the passive controller and the robotic instrument for example. Also, the speed with which the robotic instrument can move may be limited, for safety reasons for example, and the user of the passive controller may move the passive controller too quickly for the robotic instrument to mirror.

In use, a user of the apparatus may move the passive controller to cause a control command to be issued setting a desired pose for the end effector of the robotic instrument. The apparatus then determines joint parameters for the robotic instrument to mimic the desired pose using an IK algorithm. In particular, the IK algorithm calculates one or more poses of the end effector wherein each calculated pose is based on a respective set of joint parameters as an initial condition and is compared with the desired pose to determine a tracking error for that calculated pose, i.e., how accurately that calculated pose mimics the desired pose. The IK algorithm then identifies the calculated pose with the smallest tracking error as the global solution unless the smallest tracking error is larger than that associated with the current pose of the end effector, in which case the current pose is identified as the global solution. In other words, the calculated pose that most accurately mimics the desired pose is selected as the global solution, provided that calculated pose is more accurate than the current pose. If the calculated pose with the smallest tracking error is identified as the global solution, rather than the current pose, the apparatus will generate a motor command to move the robotic instrument according to the global solution.

By means of the present invention, the robotic instrument may be controlled to track the passive controller as closely as possible, i.e., with the lowest possible tracking error available for the poses calculated by the IK algorithm. Further, as the calculated pose with the smallest tracking error is always compared against the current pose before being implemented, the apparatus will never move the end effector to a pose that is worse than the current pose.

In embodiments of the invention, the different sets of joint parameters may be randomly chosen.

In such embodiments of the invention, the IK algorithm implements a random shooting approach on the initial conditions. This enables a global solution to be found using a local algorithm.

In embodiments of the invention, the inverse kinematics algorithm may be configured to reiterate the calculating and comparing steps until a predefined time limit has expired or until a predefined terminal constraint has been satisfied.

In such embodiments of the invention, the terminal constraint indicates the expected accuracy of the IK algorithm, i.e., the maximum tracking error between the desired pose and the calculated pose for a solution to be considered exact. This is required to account for a numerical accuracy of digital computations, practical precision of an instrument and to ensure a finite convergence time.

In embodiments of the invention, the inverse kinematics algorithm may include a predefined position limit to enable the calculation of partially constrained poses of the end effector that satisfy position constraints of the robotic instrument.

In such embodiments of the invention, the position constraints may be based on the physical limitations of the robotic instrument. Hence, calculation of partially constrained poses ensures that the pose is physically possible.

In embodiments of the invention, the inverse kinematics algorithm may further include a predefined velocity limit to enable the calculation of constrained poses of the end effector that satisfy both position and velocity constraints of the robotic instrument.

In such embodiments of the invention, the predefined velocity limit may be based on a maximum velocity for the robotic instrument that is deemed safe. Restricting control of the robotic instrument to constrained poses may allow a user to monitor the robotic instrument's movement, gauge its trajectory and have the ability to override the movement if it is potentially unsafe.

In embodiments of the invention, the inverse kinematics algorithm may be configured to apply the predefined position and velocity limits separately to enable the calculation of both constrained and partially constrained poses of the end effector.

In such embodiments of the invention, the user may be able to selectively allow the apparatus to control the robotic instrument based on partially constrained poses rather than constrained poses. This may help to overcome situations where limiting the robotic instrument to constrained poses excessively restricts the ability for the robotic instrument to track the passive controller.

In embodiments of the invention the passive controller and robotic instrument may have freedom of movement within respective control and instrument workspaces, and the control workspace may be mapped to the instrument workspace to allow the pose of the robotic instrument to track the pose of the passive controller as the passive controller moves within the control workspace. Further, the passive controller may comprise an unlock mechanism configured to reinstate tracking of the robotic instrument pose to the passive controller pose following a tracking interruption, and activation of the unlock mechanism may cause the apparatus to: determine whether a constrained pose identified as a constrained global solution matches a partially constrained pose identified as a partially constrained global solution; and generate a motor command according to the set of joint parameters associated with the partially constrained global solution if the constrained and partially constrained poses do not match.

It may be possible for the user to move the passive controller in the control workspace in such a way that cannot be replicated identically by the end effector moving within the instrument workspace. For example, the robotic instrument may freeze when motion of the passive controller maps to the robotic instrument motion faster than the maximum joint-space velocity limits.

Activation of the unlock mechanism causes the apparatus to check if the robotic instrument's current constrained pose is equivalent to a partially constrained pose identified as a partially constrained global solution, i.e. the best available solution within the position limits of the robotic instrument. If not, the apparatus will move the robotic instrument to the partially constrained pose. Hence the unlock mechanism allows the robotic instrument to resume optimal tracking of the passive controller in instances where tracking may have been interrupted.

In embodiments of the invention, if the partially constrained pose does not satisfy the velocity constraints of the robotic instrument, the apparatus may be configured to: determine, using a trajectory algorithm, a trajectory of movement for the robotic instrument within the instrument workspace such that the end effector moves from the current pose to the partially constrained pose within the predefined velocity limit; and generate the motor command to automatically control movement of the robotic instrument according to the determined trajectory.

In such embodiments of the invention, use of the trajectory algorithm ensures that, while the unlock mechanism is activated, the robotic instrument may move to a partially constrained pose while still satisfying the velocity limits.

In embodiments of the invention, the apparatus may be configured to redetermine the trajectory of movement as the pose of the passive controller changes.

In such embodiments of the invention, if the user moves the passive controller while the robotic instrument is following the determined trajectory, the trajectory will be redetermined accordingly to ensure that the robotic instrument ends its trajectory at a partially constrained pose calculated for the current passive controller pose rather than the previous pose.

In embodiments of the invention the trajectory algorithm may comprise a global scaling factor which is computed to ensure that the movement of the robotic instrument does not exceed the predefined velocity limit.

In such embodiments of the invention, applying the global scaling factor may reduce the velocity at which the joints of the robotic instrument move while the robotic instrument follows the determined trajectory relative to the velocity at which the joints would be required to move for the same trajectory when the robotic instrument is under normal operation, i.e., when the unlock mechanism is not activated.

In embodiments of the invention the trajectory algorithm may comprise a user-defined scaling factor to slow the movement of the robotic instrument to below the predefined velocity limit.

In such embodiments of the invention, the user-defined scaling factor may reduce the velocity at which the joints move even more than the global scaling factor. This may improve the ability of the user to monitor, gauge and possibly override the determined trajectory in instances where the movement may be unsafe.

In embodiments of the invention, the inverse kinematics algorithm may comprise one or more of the Kinematics and Dynamics Library solver, the Improved Kinematics and Dynamics Library solver and the Sequential Quadratic Programming solver. Further, in some embodiments of the invention the inverse kinematics algorithm may comprise two or more solvers running concurrently such that the solver which identifies the global solution first terminates the other solvers.

In such embodiments of the invention, the time in which solutions are calculated may be reduced.

In embodiments of the invention, the joint parameters for each of the plurality of joints may comprise one or more of the position, angle, orientation, configuration and velocity of the joint.

In embodiments of the invention, the inverse kinematics algorithm may have the form:

$$q_{init} = q$$
$$(p^*, q^*) = (p, q)$$
$$\text{while } t < t_{max} \text{ and } \|p_{ref} - p^*\| > \varepsilon:$$
$$\quad q_i = \text{solver}(q_{init}, p_{ref})$$
$$\quad (p^*, q^*) = \begin{cases} (p_i, q_i) & \text{if } \|p_{ref} - p_i\| < \|p_{ref} - p^*\| \\ (p^*, q^*) & \text{otherwise} \end{cases}$$
$$\text{choose new random } q_{init}$$

where $p_{ref} \in \Re^6$ represents the desired end effector pose as received from the passive controller, $p_i = f(q_i) \in \Re^6$ stands for the end effector pose as computed by the current iteration of the algorithm, $q_{init} \in \Re^6$ denotes the algorithm initial condition, where $p = f(q) \in \Re^6$ is an end effector pose computed based on the current state of the robotic instrument (or last joint-space command sent to motors driving the robotic instrument if no joint angle sensor feedback is available), $p^* = f(q^*) \in \Re^6$ represents current control candidate (i.e., the best solution calculated so far) and $\varepsilon \in \Re^1$ denotes the accepted algorithm tolerance; $t \in \Re^1$ and $t_{max} \in \Re^1$ represent current and maximum time the algorithm can run.

In embodiments of the invention, the inverse kinematics algorithm may have the form:

$$q_{init} = q$$
$$(p^*, q^*) = (p, q)$$
$$(\bar{p}^*, \bar{q}^*) = (p, q)$$
$$\text{while } t < t_{max} \text{ and } \|p_{ref} - p^*\| > \varepsilon:$$
$$\quad q_i = \text{start local algorithm } (q_{init}, p_{ref})$$
$$\quad \text{while local algorithm is running:}$$
$$\quad\quad q_i = \text{step local algorithm } (q_{init}, p_{ref})$$
$$\quad\quad (p^*, q^*) = \begin{cases} (p_i, q_i) & \text{if } \|p_{ref} - p_i\| < \|p_{ref} - p^*\| \\ (p^*, q^*) & \text{otherwise} \end{cases}$$
$$\quad\quad (\bar{p}^*, \bar{q}^*) = \begin{cases} (p_i, q_i) & \text{if } \|p_{ref} - p_i\| < \|p_{ref} - p^*\| \, \& \\ & \forall k \in \{0, \ldots, n\}: \|\dot{q}_k\| < \dot{q}_k^{max} \\ (\bar{p}^*, \bar{q}^*) & \text{otherwise} \end{cases}$$

choose new random $q_{init}$ where (̄) marks variables that lie within velocity limits and the 'local algorithm' refers to any algorithm that computes local solutions.

In embodiments of the invention, the trajectory algorithm may have the form:

$$k_L = 1$$
$$\forall_{k \in \{0, \ldots, n\}}:$$
$$\quad \Delta q_k^* = (q_k^* - q_k)\sin(k_\omega t)$$
$$s = \frac{k_s \Delta q_{k,max}}{\|\Delta q_k^*\| + \varepsilon}$$
$$\text{if } s < k_L \Delta : \rightarrow k_L = s$$
$$q_u = q + k_L \Delta q^*$$
$$\text{if } k_L = 1 : \rightarrow t = t + \Delta t$$
$$\text{if } k_L = 1 \text{ and } \Sigma_{k=1}^n (q_k^* - q_k) < k_t : \rightarrow \text{terminate}$$

where $k_L \in \mathfrak{R}^+$ represent a global scaling factor to ensure the generated trajectory lies within the joint space velocity limits, $k_s \in \mathfrak{R}^+$ stands for a user-defined scaling factor to slow down the movement to a velocity below the predefined velocity limit, and $k_f \in \mathfrak{R}^+$ is a terminal constraint threshold to finish trajectory.

In embodiments of the invention, the robotic instrument may be a surgical robot.

In embodiments of the invention, the apparatus may comprise the passive controller and/or robotic instrument.

According to a second aspect of the invention, there is provided a computer-implemented method comprising: receiving a control command from a passive controller, the passive controller configured to remotely control a robotic instrument having a plurality of joints and an end effector, the control command defining a desired pose of the end effector; determining, based on the control command, joint parameters for each of the plurality of joints using an inverse kinematics algorithm to enable the end effector to mimic the desired pose as closely as possible within a constrained environment, wherein the inverse kinematics algorithm is configured to: calculate a pose of the end effector using a first set of joint parameters as an initial condition; compare the calculated pose with the desired pose to determine a tracking error; reiterate the calculating and comparing steps for one or more different sets of joint parameters; and identify the calculated pose with the smallest tracking error as a global solution only if the tracking error is smaller than that associated with a current pose of the end effector, otherwise identify the current pose as the global solution; and wherein the method further comprises generating a motor command to reconfigure the plurality of joints according to the set of joint parameters associated with the global solution if the calculated pose with the smallest tracking error is identified as the global solution.

According to a third aspect of the invention, there is provided a computer program comprising computer code configured to perform a method according to the second aspect of the invention.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

Embodiments of the invention will now be described, by way of example only, with reference to the accompanying drawings, in which:

FIGS. 4a and 4b are further schematic representations of the robotic instrument shown in FIG. 3;

DESCRIPTION OF SPECIFIC ASPECTS/EMBODIMENTS

Figure 1:
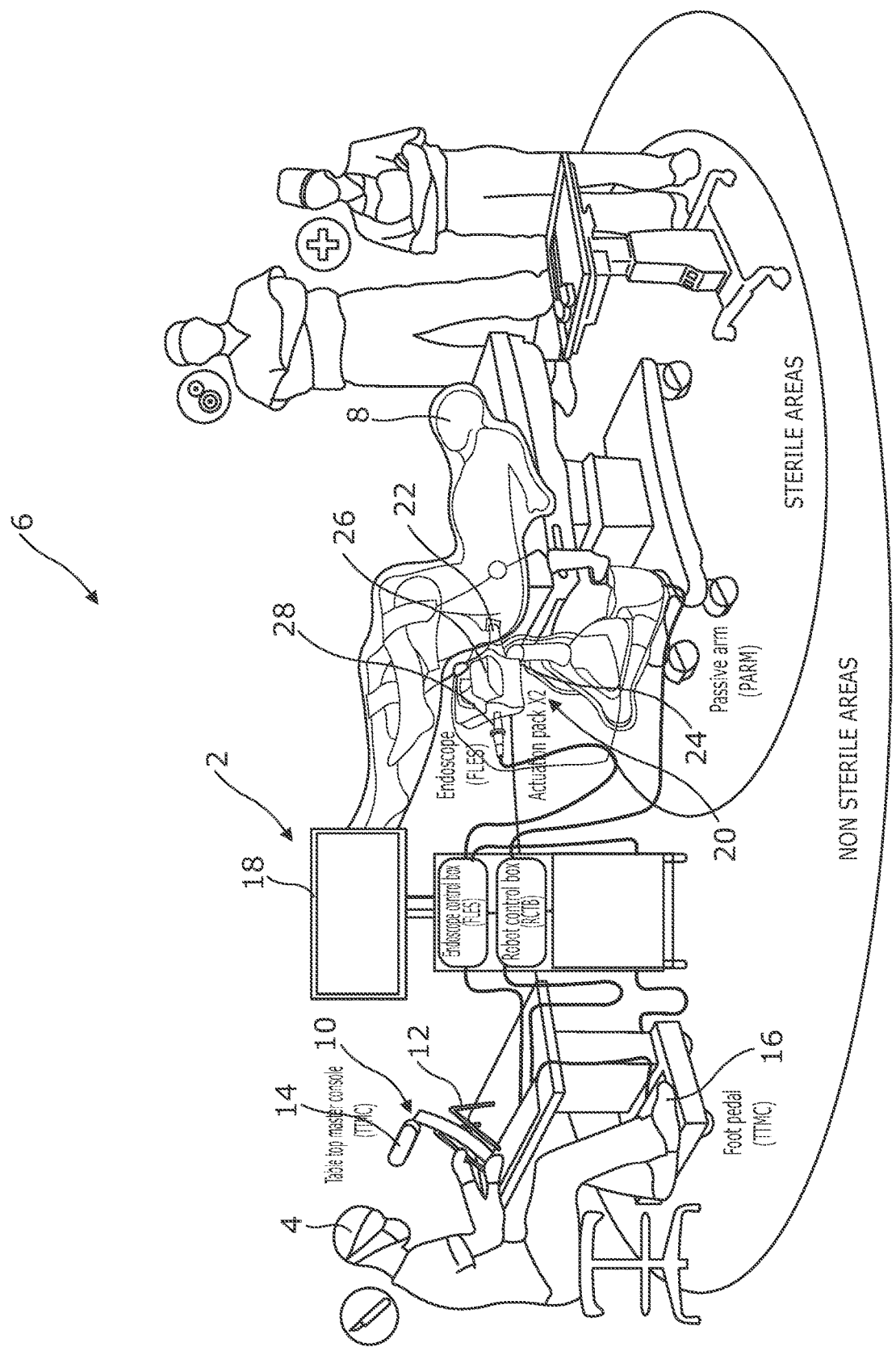
FIG. 1 is a schematic representation of an apparatus, according to the first aspect of the invention, in use.

Referring initially to FIG. 1, an apparatus according to the first aspect of the invention is designated generally by the reference numeral 2. The apparatus 2 comprises at least one processor and at least one memory including computer program code. The apparatus 2 is shown being used by a user 4 in an operating theatre 6 to carry out a surgical procedure on a patient 8. The user 4 may therefore be a surgeon.

In this embodiment of the invention, the apparatus 2 further comprises a control station 10 including a pair of passive controllers 12 (shown in more detail in FIG. 2), a view port 14 and pedal controls 16. The passive controllers 12 may each be manipulated within respective control workspaces by the user 4.

The apparatus further comprises an electronic display screen 18, a surgical robot 20 including a pair of robotic instruments 22 (shown in more detail in FIG. 3), a robot platform 24 and robot motors 26. The robotic instruments are mounted to the robot platform 24 which is arranged to position the robotic instruments inside the patient 8. The robot motors 26 are also mounted to the robot platform 24 and operatively coupled to the robotic instruments to drive movement of the robotic instruments within respective instrument workspaces.

The view port 14, the electronic control screen 18, or both may be configured to display a representation of the instrument and control workspaces. Further, the apparatus 2 is configured to control the view port 14 and/or electronic display screen 18 such that the current position and/or orientation of the robotic instruments and passive controllers 12 are indicated within the representations of the respective instrument and control workspaces. Also, the apparatus 2 is configured to control the view port 14 and/or electronic display screen 18 such that the current position and/or orientation are indicated in two or three dimensions.

The current position and/or orientation of the passive controller 12 and robotic instrument are the last known position and/or orientation of the passive controller 12 and robotic instrument to the apparatus, respectively.

An endoscope 28 is also mounted to the robot platform 24 and inserted inside the patient 9. The endoscope 28 may record images of site of the surgical procedure, including the robotic instruments in use, and the recorded images may be transmitted to the control station 10 to be displayed in the viewport 14 and/or electronic display screen 18 to be shown alongside the representations of the control and instrument workspaces, or with the workspaces superimposed on to the recorded images.

Figure 2:
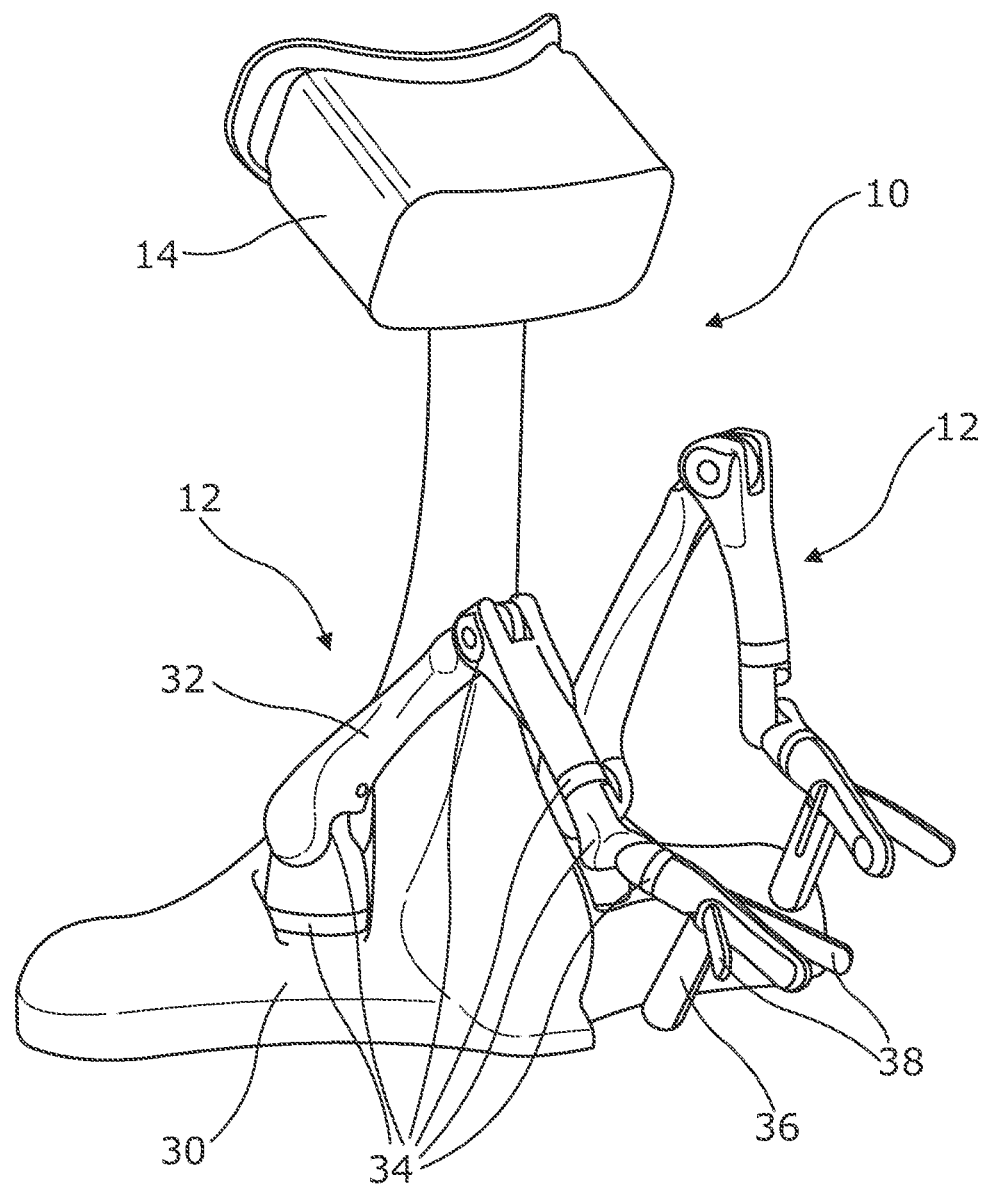
FIG. 2 is a schematic representation of a passive controller forming part of the apparatus shown in FIG. 1.

Referring now to FIG. 2, each passive controller 12 comprises a controller base 30; an articulatable arm 32, coupled to the controller base 30 and comprising a plurality of controller joints 34; and a handle 36, coupled to the articulatable arm 32 and comprising grippers 38. Each of the controller joints 34 are freely rotatable, i.e. there is no means for actively varying the torque required to rotate each joint as there would be in known active controllers. The handles 36 are thereby freely moveable within the respective control workspace by the user 4 (shown in FIG. 1). Further, each passive controller 12 and particularly each handle 36, may be considered as having a position in the respective control workspace and an orientation relative to the control workspace. In combination, the position and orientation of the passive controller 12 may be considered as the passive controller pose.

From here on embodiments of the invention are described with respect to a single passive controller 12 and a corresponding robotic instrument. However, it is to be understood that the apparatus may comprise two or more passive controllers and a corresponding number of robotic instruments.

Figure 3:
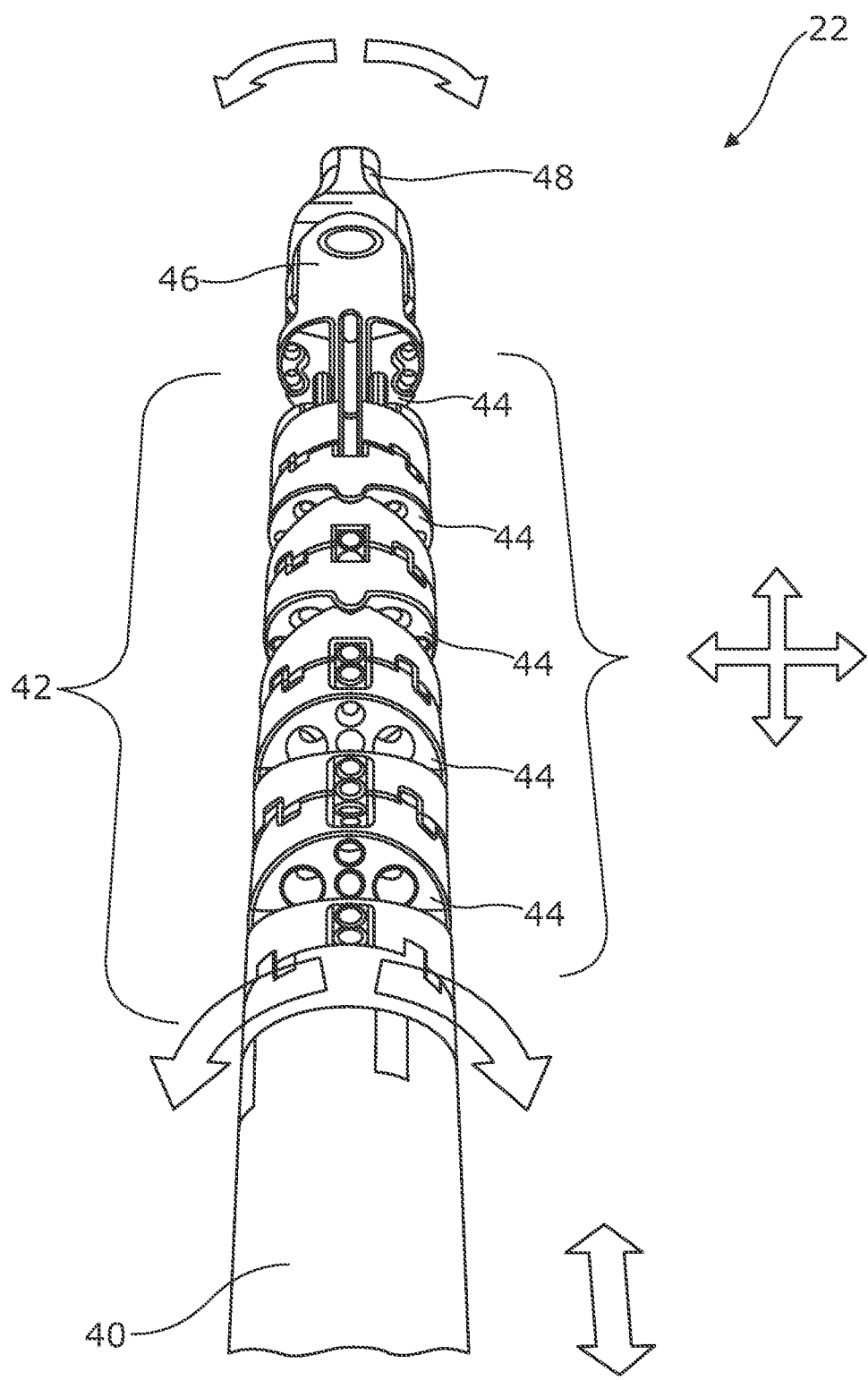
FIG. 3 is a schematic representation of a robotic instrument forming part of the apparatus shown in FIG. 1.

Referring now to FIG. 3, a robotic instrument 22, equivalent to the robotic instrument positioned inside the patient 8 in FIG. 1, comprises an instrument base 40, an actuatable arm 42 and an end effector 46.

In this embodiment of the invention, the instrument base 40 is a shaft that may extend from the robot platform 24 shown in FIG. 1 and facilitate suitable positioning of actuatable arm 42 and end effector 46 relative to the patient 8. The actuatable arm 42 is coupled to the instrument base 40 and comprises a plurality of instrument joints 44. Each instrument joint 44 is rotatable and rotation may be driven by a motor forming part of the robot motors 26 shown in FIG. 1 via tendons that extend from the instrument platform 24, through the instrument base 40 and are attached to the relevant instrument joint 44. The end effector 46 is coupled to the actuatable arm 42 and is moveable within the instrument workspace through rotation of one or more of the instrument joints 44. The, robotic instrument 22 and particularly the end effector 46, may be considered as having a position in the instrument workspace and an orientation relative to the instrument workspace. In combination, the position and orientation of the end effector 46 may be considered as the robotic instrument/end effector pose.

The end effector 46 also comprises a pair of jaws 48 moveable between an open configuration and a closed configuration (shown in FIG. 3). Opening and closing of the jaws 48 may be controlled by the user 4 by manipulating the grippers 38 of the corresponding passive controller 12 shown in FIG. 2.

Referring now to both FIGS. 2 and 3, each passive controller 12 and its respective robotic instrument 22 have freedom of movement within respective control and instrument workspaces. In use, the control workspace is mapped to the instrument workspace to allow the pose of the robotic instrument 22 to track the pose of the passive controller 12 as the passive controller 12 moves within the control workspace.

However, the instrument workspace within which the end effector 46 is moveable is typically very different in scale to the control workspace within which the handle 36 is moveable. Further, the arrangement of the instrument joints 44 in the actuatable arm 42 is typically very different to the arrangement of the controller joints 34 in the articulatable arm 32 meaning that the shape of the instrument workspace often differs to the shape of the control workspace.

Therefore, the control workspace cannot always be mapped perfectly to the instrument workspace due to the differences described above. This means that is possible for the user 4 to move the handle 36 to a pose in the control workspace which cannot be replicated identically by the end effector 46 moving within the instrument workspace.

Referring now to FIGS. 4a and 4b, the robotic instrument 22 has six degrees of freedom (DoF) with eight instrument joints. The specific instrument joints are further defined in Table 1.

TABLE 1

Definition of robotic instrument joints

| Reference | Joint Type | Joint Name | Notes |
|---|---|---|---|
| 100 | Virtual | Base | This is a virtual joint located at the base of the robot. |
| 101 | Revolute | Roll | This joint provides roll motion of the instrument. |
| 102 | Prismatic | Translation | This joint provides axial translation along Z-axis. |
| 103, 106 | Revolute | Elbow Pitch | These two joints are paired. |
| 104, 105 | Revolute | Elbow yaw | These two joints are paired. |
| 107 | Revolute | Wrist pitch | This joint is for wrist pitch. |
| 108 | Revolute | Wrist yaw | This joint is for wrist yaw. |
| 109, 110 | Virtual | Jaws | Two joints are coupled and provide jaw opening. |

Base joint 100 is a virtual joint that indicates where the robot base is located. Roll joint 101 is a revolute joint that provides roll motion. Translation joint 102 is a prismatic joint providing translational motion. Elbow pitch joints 103 and 106 are two paired joints for elbow pitch motion whose movements are the same. Similarly, elbow yaw joints 104 and 105 are two paired joints for elbow yaw motion whose movements are the same. Wrist pitch joint 107 is a revolute joint for wrist pitch motion and wrist yaw joint 108 is a revolute joint for wrist yaw motion. Lastly, jaw joints 109 and joint 110 are two virtual joints for left and right jaws, respectively.

Set out below is a description of the inverse kinematics algorithms used by embodiments of the invention to determine motor commands that actuate the instrument joints 101-108 in order that the pose of the robotic instrument 22 tracks the pose of the associated passive controller 32 (shown in FIG. 2) as accurately as possible, even if an exact solution is not possible.

Inverse Kinematics—Basic

The robotic instrument's end-effector pose can be denoted as x, and the set of joint angles required for that particular end-effector pose can be denoted as q. Formally, a Jacobian is a set of partial differential equations:

$$J = \frac{\partial x}{\partial q}, \quad (1)$$

which can be rewritten to $$\frac{\partial x}{\partial t} = J \frac{\partial q}{\partial t}. \quad (2)$$

Essentially the Jacobian relates how the movement of the elements of q causes movement of the elements of x. Equation (2) may be rewritten as $$\dot{x} = J\dot{q}, \quad (3)$$

where $\dot{q}$ is the velocity of the joint and $\dot{x} \in \Re^6$ is the velocity of the end-effector. The IK problem calculates the desired joint velocity given the desired end-effector twist, that is the velocity of the end effector as it travels with up to six 6 degrees of freedom towards the desired pose.

TABLE 2

Transformation between joint coordinates.

| Index | $t_x$ | $t_y$ | $t_z$ | $r_x$ | $r_y$ | $r_z$ |
|---|---|---|---|---|---|---|
| 0 → 1 | 0 | 0 | 20 | 0 | 0 | 0 |
| 1 → 2 | 0 | 0 | 0 | 0 | 0 | 0 |
| 2 → 3 | 0 | 0 | 0 | 0 | 0 | 0 |
| 3 → 4 | 0 | 0 | 5.67 | 0 | 0 | 0 |
| 4 → 5 | 0 | 0 | 5.67 | 0 | 0 | 0 |
| 5 → 6 | 0 | 0 | 5.67 | 0 | 0 | 0 |
| 6 → 7 | 0 | 0 | 8.785 | 0 | 0 | 0 |
| 7 → 8 | 0 | 0 | 7.6 | 0 | 0 | 0 |
| 8 → 9 | 0 | 0 | 0 | 0 | 0 | 0 |
| 9 → 10 | 0 | 0 | 0 | 0 | 0 | 0 |

Coupling Matrix

To achieve identical motion for the paired joints, a coupling matrix is used. The coupling matrix C maps the independent joint configuration $\hat{q}$ to coupled joint configuration q:

$$q = C\hat{q} \quad (4)$$

For the robotic instrument 22, the coupling matrix is defined as an 8-by-6 matrix:

$$\begin{bmatrix} q_1 \\ q_2 \\ q_3 \\ q_4 \\ q_5 \\ q_6 \\ q_7 \\ q_8 \end{bmatrix} = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 1 & 0 & 0 \\ 0 & 0 & 1 & 0 & 0 & 0 \\ 0 & 0 & 0 & 0 & 1 & 0 \\ 0 & 0 & 0 & 0 & 0 & 1 \end{bmatrix} \begin{bmatrix} \hat{q}_1 \\ \hat{q}_2 \\ \hat{q}_3 \\ \hat{q}_4 \\ \hat{q}_5 \\ \hat{q}_6 \end{bmatrix} \quad (5)$$

The coupling matrix can also be used to map Jacobian for q to $\hat{q}$:

$$\hat{f}\hat{q} = JC \quad (6)$$

where J is 6-by-8 Jacobian for q and f is 6-by-6 Jacobian for $\hat{q}$:

$$\dot{x} = \hat{J} = JCq \quad (7)$$

Forward Kinematics

Forward kinematics calculate the end-effector pose based on input joint angles. From the first joint, it goes through the kinematics chain joint by joint and obtains the pose of the end-effector with respect to the base coordinate normally located at the first joint. Its implementation is available from KDL library (Orocos Project https://www.orocos.org/kdl.html) "KDL::ChainFkSolverPos_recursive::JntToCart( )".

To handle the paired joints in forward kinematics, the coupling matrix is used. Its implementation is available in "pr::ChainFkSolverPosCoupling_recursive".

Computation of Jacobian

Jacobian is calculated based on the current joint configuration. Its implementation is in "ChainJntToJacSolverCoupling::JntToJacCoupling( )".

Types of Solvers

Numerical IK algorithms can be divided into two subsets, global and local optimisation algorithms. The former look through the whole search space and provide the best possible solution (the global solution). The latter employs the knowledge of a mathematical function and looks for a best solution near the algorithm initial conditions, i.e., the initial state on which the further computations are based on.

Figure 5:
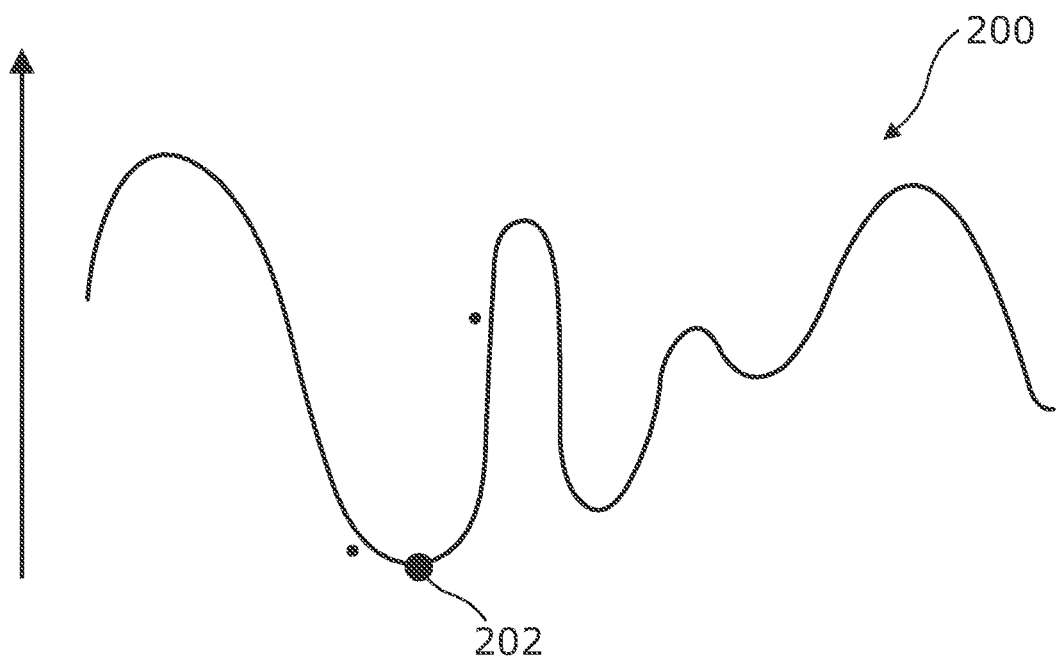
FIG. 5 is a graphical representation of a global solution for an arbitrary function.

An example of a global solution 202, which may be found using a global algorithm, is shown in FIG. 5 for an arbitrary function 200; it is the overall minimum value of the function.

Figure 6:
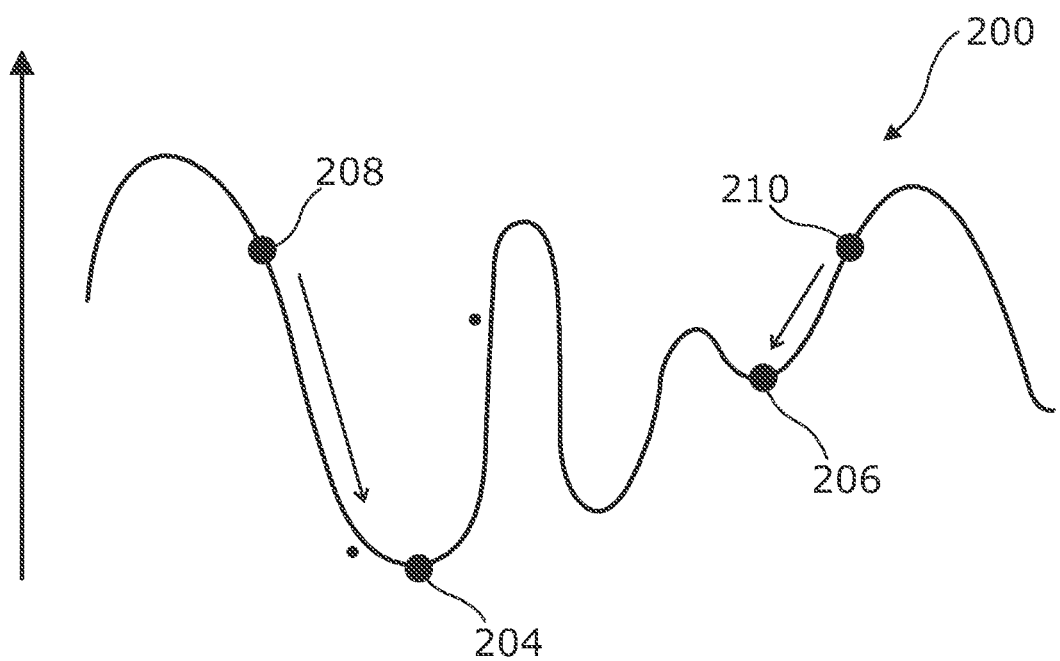
FIG. 6 is a graphical representation of local solutions for the arbitrary function shown in FIG. 5.

A local algorithm compares the current value of a function with its neighbourhood and moves the solution towards the smaller values. Further, a local algorithm terminates when all nearby values are higher than the current solution. FIG. 6 shows two possible local solutions 204, 206 for the same function 200 based on two different initial conditions 208, 210. One local solution 204 is equivalent to the global solution 202 (shown in FIG. 5) while the other local solution 206 is different.

If the apparatus 2 (shown in FIG. 1) were to use a local algorithm when the robotic instrument 22 is already in a local minimum with respect to the desired end effector pose set by the user 4 with the passive controller 12, the local algorithm would keep returning the same local solution (e.g. 206 in FIG. 6) even though a better solution may be possible (e.g. 204 in FIG. 6). As a result no motion of the robotic instrument 22 will be performed and the robotic instrument 22 will seem unresponsive to the user 4.

Even though global algorithms may seem superior over local ones because they provide an objective best answer, local algorithms are often preferred because they are faster, terminate in a finite time and have better smoothness properties. For the purposes of this disclosure, the smoothness properties can be roughly interpreted as preventing the robotic instrument 22 from jumping or moving jerkily.

Embodiments of the invention find a global solution while profiting from the efficacy of local algorithms by implementing a random shooting approach on the initial conditions of the local algorithm. The local algorithm is restarted multiple times with randomly selected initial conditions. At the end, only the best local solution found is returned from the algorithm.

In particular, the apparatus 2 is configured to receive a control command from the passive controller 12, the passive controller 12 being configured to remotely control the robotic instrument 22 having a plurality of joints 44 and an end effector 46 and the control command defining a desired pose of the end effector 46. The apparatus 2 then determines, based on the control command, joint parameters for each of the plurality of joints 44 using an inverse kinematics algorithm to enable the end effector 46 to mimic the desired pose as closely as possible within a constrained environment, i.e. the instrument workspace. The inverse kinematics algorithm is configured to calculate a pose of the end effector 46 using a first set of joint parameters as an initial condition; compare the calculated pose with the desired pose to determine a tracking error; reiterate the calculating and comparing steps for one or more different sets of joint parameters; and identify the calculated pose with the smallest tracking error as a global solution provided the tracking error is smaller than that associated with a current pose of the end effector 46, otherwise the current pose is identified as the global solution. The apparatus 2 is further configured to generate a motor command to reconfigure the plurality of joints 44 according to the set of joint parameters associated with the global solution if the calculated pose with the smallest tracking error is identified as the global solution.

The different sets of joint parameters are randomly chosen. Hence, it is the reiteration of the calculating and comparing steps for one or more different sets of joint parameters that provides the random shooting approach which allows a global solution to be found.

Constraints

Figure 7:
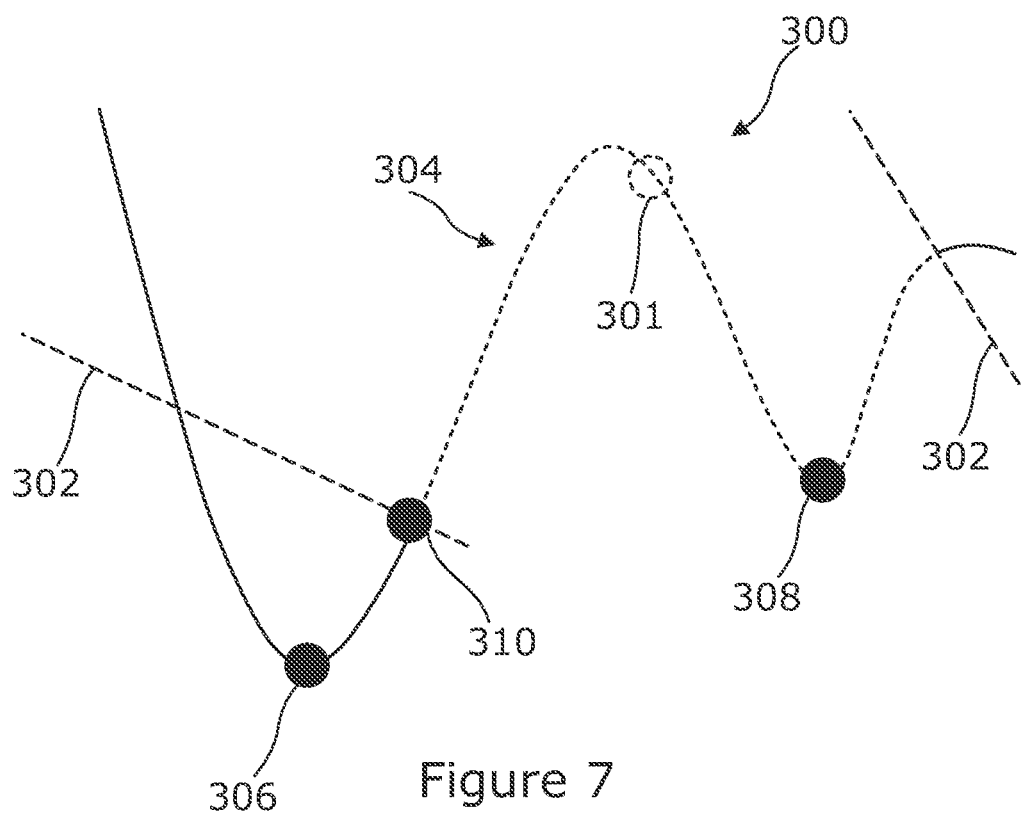
FIGS. 7, 8 and 9 are graphical representations of constrained and unconstrained solutions for different arbitrary functions.

In use, the apparatus 2, and particularly the robotic instruments 22, are subject to various limitations. In particular, the position of the end effector 46 is limited to the instrument workspace. Also, the velocity at which the end effector is allowed to move may be limited based on physical limitations of the robotic instrument or a maximum velocity that is considered safe for a particular application. To account for these limitations, constraints are added to the optimisation problem that limit the algorithm to a set of feasible solutions. In FIG. 7 solutions are calculated for an arbitrary function 300 based on a current state 301. The feasible solutions are limited by constraints 302 to a constrained region 304 of the arbitrary function 300. An unconstrained global solution 306 exists outside of the constrained region 304 and is therefore not feasible. Meanwhile a local solution 308 exists within the constrained region 304 and is hence feasible. There is also a constrained global solution 310 which is feasible, as it is within the constrained region 304, and is also superior to the unconstrained local solution 308.

Figure 8:
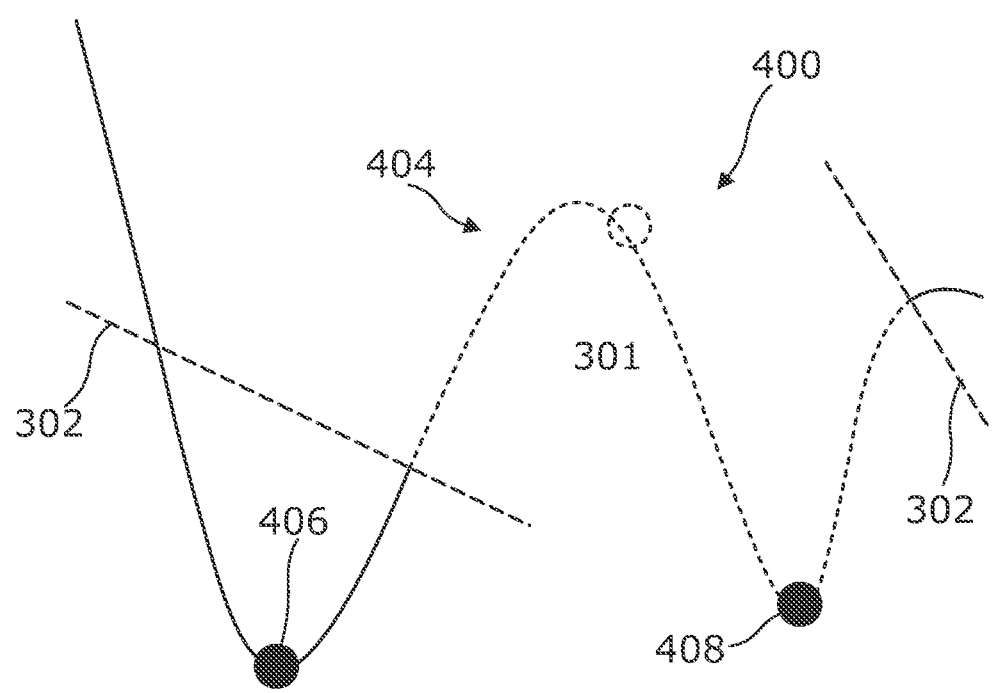

In FIG. 8, solutions are calculated for a new arbitrary function 400 based on the same current state 301 and with the same constraints 302 applied to provide a constrained region 404. In this example, an unconstrained global solution 406 exists similarly to that shown in FIG. 7 which is outside of the constrained region 404 and is therefore not feasible. However, for arbitrary function 400, a local solution 408 exists which is the best available solution in the constrained region 404 and is therefore the constrained global solution.

Figure 9:
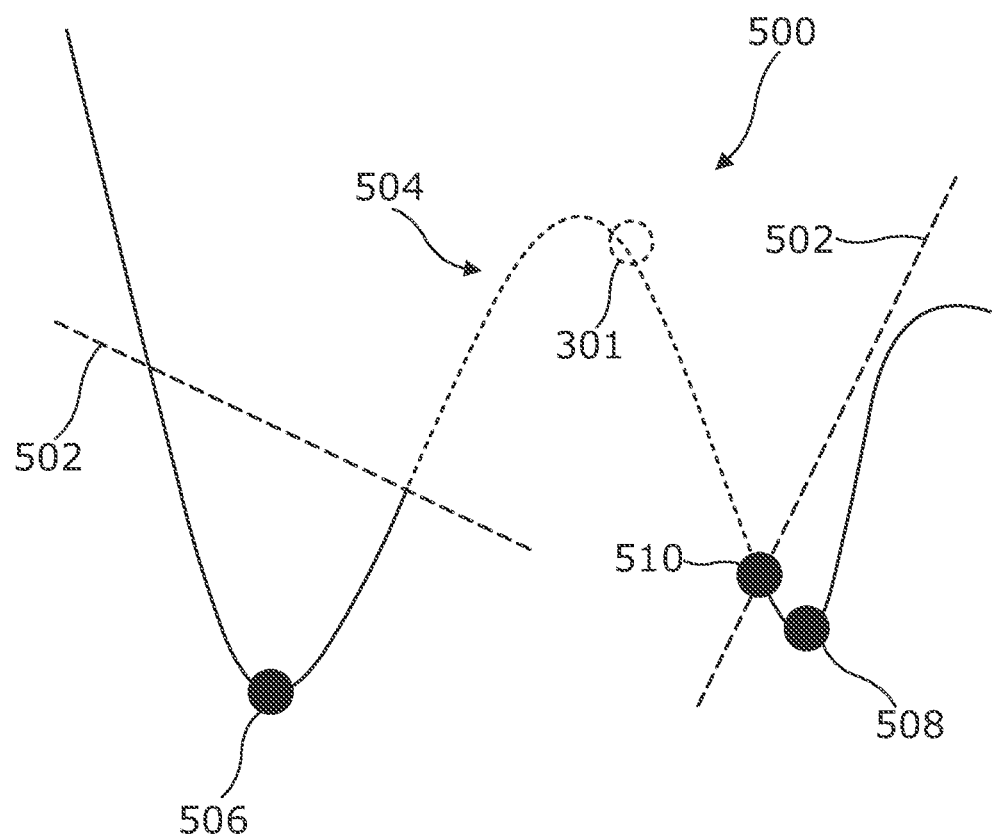

In FIG. 9, solutions are calculated for a further arbitrary function 500 based on the same current state 301 but with new constraints 502 providing a constrained region 504. An unconstrained global solution 506 exists similarly to that shown in FIGS. 7 and 8 which is outside of the constrained region 504 and is therefore not feasible. In this instance, an unconstrained local solution 508 also exists outside of the constrained region 504. A constrained local solution 510, however, exists within the constrained region 504 which is the best available solution in the constrained region 504 and is therefore the constrained global solution as well as the constrained local solution.

In embodiments of the invention, the IK algorithm includes a predefined position limit to enable the calculation of partially constrained poses of the end effector that satisfy position constraints of the robotic instrument. The position constraints may be based on the instrument workspace which is, in turn, based on physical limitations of the robotic instrument 22 (FIG. 3) such as the length of the robotic instrument 22, the range of motion achievable by each joint 44 and the position of each joint 44 along the length of the robotic instrument 22. To ensure that any solution calculated by the IK algorithm is physically possible, the position constrains may always be applied when the apparatus 2 is in use such that all solutions are partially constrained.

The IK algorithm may further include a predefined velocity limit to enable the calculation of constrained poses of the end effector that satisfy both position and velocity constraints of the robotic instrument. The predefined velocity limit may be based on a maximum velocity for the robotic instrument that is deemed safe and allows a user to monitor the movement, gauge the trajectory and have the ability to override the movement if it is potentially unsafe.

Inverse Kinematics—Foundations

In embodiments of the invention, the inverse kinematics algorithm comprises one or more of the Kinematics and Dynamics Library solver, the Improved Kinematics and Dynamics Library solver and the Sequential Quadratic Programming solver.

Conventional IK—Kinematics and Dynamics Library (KDL) Solver

There are two types of IK: velocity and position. The calculation of the position IK may be based on the velocity IK.

For velocity IK, the aim is to calculate joint velocity $'q$ based on end-effector twist $'x$. Recall that $$'q = J^{-1}{'x}. \tag{8}$$

Since the Jacobian may not be an invertible matrix, pseudoinverse is used. To estimate the pseudoinverse of the Jacobian, $J^+$, singular value decomposition (SVD) is used. The SVD theorem states that any matrix can be written as the product of three non-unique matrices. Therefore a m×n Jacobian matrix can be factorised as $$J = U\sum V^T, \tag{9}$$

where $\Sigma$ is a m×n diagonal matrix with non-negative diagonal elements known as singular values. U is an m×m matrix and V is an n×n matrix. It is common to write the SVD as the sum of vector outer product:

$$J = \sum\nolimits_{i=1}^{min(m,n)} \sigma_i u_i v_i^T, \tag{10}$$

where $\sigma_i$ is a singular value which is ordered from large to small in the singular vector. Then the pseudoinverse of the Jacobian can be found from the SVD by taking the reciprocal of all nonzero singular values. In particular, the pseudoinverse $J^+$ is given by:

$$J^+ = \sum\nolimits_{i=1}^{min(m,n)} \frac{1}{\sigma_i} v_i u_i^T, \tag{11}$$

where r is the rank of J. The implementation of this method is available in KDL's "ChainIKSolverVel_pinv".

For position IK, the aim is to calculate joint position q using end-effector pose x. This can be achieved by exploiting the forward kinematics (FK) and velocity IK solvers. The implementation is available in "pr::ChainIKSolverPosCouplingNrJntLimit::CartToIntCoupling".

Concurrent Quadratic Programming IK (TRAC-IK)

The known KDL solver introduced above works fine in normal conditions when a robotic instrument hasn't reached a joint limit, that is, a limitation of movement due to its physical characteristics such as the range of motion allowed by one or more joints. KDL has the following issues according to Beeson, Patrick, and Barrett Ames (TRAC-IK: An open-source library for improved solving of generic inverse kinematics. 2015 IEEE-RAS 15th International Conference on Humanoid Robots (Humanoids)):
1. frequent convergence failures for robots with joint limits,
2. no actions are taken when the search becomes "stuck" in local minima,
3. inadequate support for Cartesian pose tolerances, and
4. no utilization of tolerances in the IK solver itself.

TRAC-IK proposed an improvement of the KDL solver and an alternative non-linear optimisation formulation for IK with several metrics.

Firstly, instead of using a maximum number of iterations as a termination constraint, the improved solver uses maximum time. This helps to compare the KDL solver with other IK solvers.

Secondly, the improved KDL solver detects local minima by checking if the difference between the current and previous estimation of q is near zero. When a local minimum is detected, a new random q will be used to "unstick" the iterative algorithm. The implementation of this improved KDL solver is available in "KDL::ChainIKSolverPos_TL".

However, the improved KDL solver still shows failure when encountering joint limits. In each iteration, the KDL solver clamps the values of q to the joint limits. Thus, joint limits make the search space non-smooth, and cause the IK solver to fail in scenarios where solutions do exist. To mitigate the issue, the IK problem can be formed as a nonlinear optimisation problem which can be solved locally using sequential quadratic programming (SQP). SQP is an iterative algorithm for nonlinear optimisation, which can be applied to problems with objective functions and constraints that are twice continuously differentiable. The objective function is:

$$\min_{q \in \Re^n} \|f(q) - p\|, \quad (12)$$

where f(q) is the FK solver returning the end-effector pose for current joint configuration q and p is the desired pose. Implementation of the SQP IK method is available in "NLOPT_IK::CartToJnt".

Although the SQP IK solver outperforms the KDL solver in terms of IK solve rate, the computation time for the SQP IK solver to converge to a solution can be much longer. TRAC_IK proposed a concurrent method which runs the improved KDL solver and SQP solver concurrently so that the overall solve rate is improved while keeping the computation time relatively low. The implementation of the concurrent algorithm is available in "TRAC_IK::CartToInt" in which both solvers are started and the solver that obtained the solution first within the allowed time can terminate the other solver.

Accordingly, in embodiments of the invention, the inverse kinematics algorithm comprises two or more solvers running concurrently such that the solver which identifies the global solution first terminates the other solvers.

Inverse Kinematics—Embodiments of the Invention

Two critical issues with respect to the robot controllability and human safety have been identified in the TRAC-IK algorithm described above. Firstly, an instrument would freeze when the desired master pose was not achievable by the instrument. Secondly, the proposed IK scheme could cause the instrument to suddenly change the kinematic configuration. To address these issues, the following modifications have been implemented in the IK algorithm:
  accept non-perfect solutions to prevent instrument freezing on the workspace boundary;
  add fictitious velocity limits to prevent a configuration change;
  provide an unlock action that brings the instrument back to the feasible workspace when the instrument freezes; and
  provide an assisted control mode to generate safe trajectories when the desired state is outside of the joint-space velocity limits.

The changes implemented to the original algorithm are described in more detail below.

Accept Non-Perfect Solutions to Prevent Instrument Freezing

In a first IK algorithm (13), the success is checked by comparing the proposed solution with the desired value. The algorithm reads

---

$q_{init} = q$
while $t < t_{max}$ and $\|p_{ref} - p^*\| > \varepsilon$:
  $q_i = \text{solver}(q_{init}, p_{ref})$ $$(p^*, q^*) = \begin{cases} (p_i, q_i) & \text{if } \|p_{ref} - p_i\| < \varepsilon \\ (p, q) & \text{otherwise} \end{cases} \quad (13)$$

choose new random $q_{init}$

--- where $p_{ref} \in \Re^6$ represents the desired end effector pose as received from the passive controller, $p_i = f(q_i) \in \Re^6$ stands for the end effector pose as computed by the current iteration of the algorithm, $q_{init} \in \Re^6$ denotes the algorithm initial condition, where $p = f(q) \in \Re^6$ is an end effector pose computed based on the current state of the robotic instrument (or last joint-space command sent to motors driving the robotic instrument if no joint angle sensor feedback is available), $p^* = f(q^*) \in \Re^6$ represents current control candidate (i.e., the best solution calculated so far) and $\varepsilon \in \Re^1$ denotes the accepted algorithm tolerance; $t \in \Re^1$ and $t_{max} \in \Re^1$ represent current and maximum time the algorithm can run. If the tracking error condition is true then the algorithm returns success, and the joint-space commands associated with $p^*$ are sent to motors that drive the robotic instrument 22.

Figure 10:
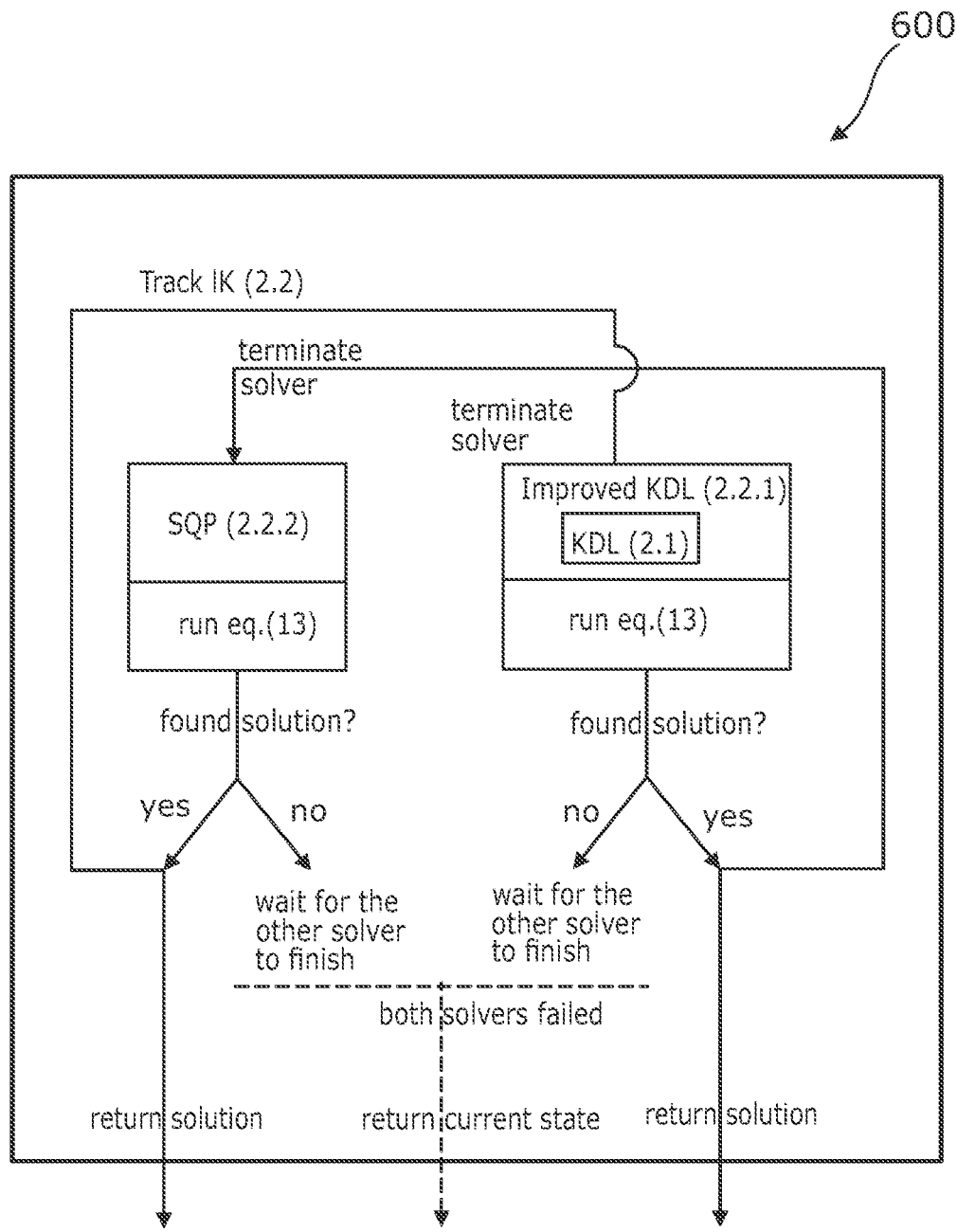
FIG. 10 is a schematic representation of an algorithm logic.

However, joint-space values satisfying the tracking condition in (13) do not always exist. Even if the feasible solution exists, in use, the IK algorithm may not be able to find the perfect solution within the time dedicated for control. In these cases, the original algorithm returns a failure and the instrument command is not updated. As a result, the instrument is unresponsive to the master commands until the solution satisfying (13) is found. FIG. 10 shows the algorithm logic of the first IK algorithm 600.

A known solution to this problem involves solving the following optimisation problem (or an equivalent one).

$$\min_{q^*} \quad (p_{ref} - f(q^*))^T (p_{ref} - f(q^*)) \tag{14}$$

$$\text{s.t.} \quad q^{min} \leq q^* \leq q^{max}$$

Algorithm (14) finds the closest solution to the desired one without any constraint on how close the found solution has to be to the desired one to be considered as a success. However, this solution is a local solution, and thus it does not support random shooting as used in (13) and can become stuck in the local minimum.

The solution used by embodiments of the invention, described below, takes the local solutions provided by (14) (or any other local optimisation algorithm e.g., KDL or SQP) and generates the global best solution found in the given time.

To keep instrument responsive to the master commands even when no perfect solution is found, (13) has been modified to provide a second IK algorithm (15) used by embodiments of the invention. It reads:

$$q_{init} = q$$
$$(p^*, q^*) = (p, q)$$
$$\text{while } t < t_{max} \text{ and } \|p_{ref} - p^*\| > \varepsilon:$$
$$\quad q_i = \text{solver}(q_{init}, p_{ref})$$
$$(p^*, q^*) = \begin{cases} (p_i, q_i) & \text{if } \|p_{ref} - p_i\| < \|p_{ref} - p^*\| \\ (p^*, q^*) & \text{otherwise} \end{cases} \tag{15}$$

choose new random $q_{init}$.

Figure 11:
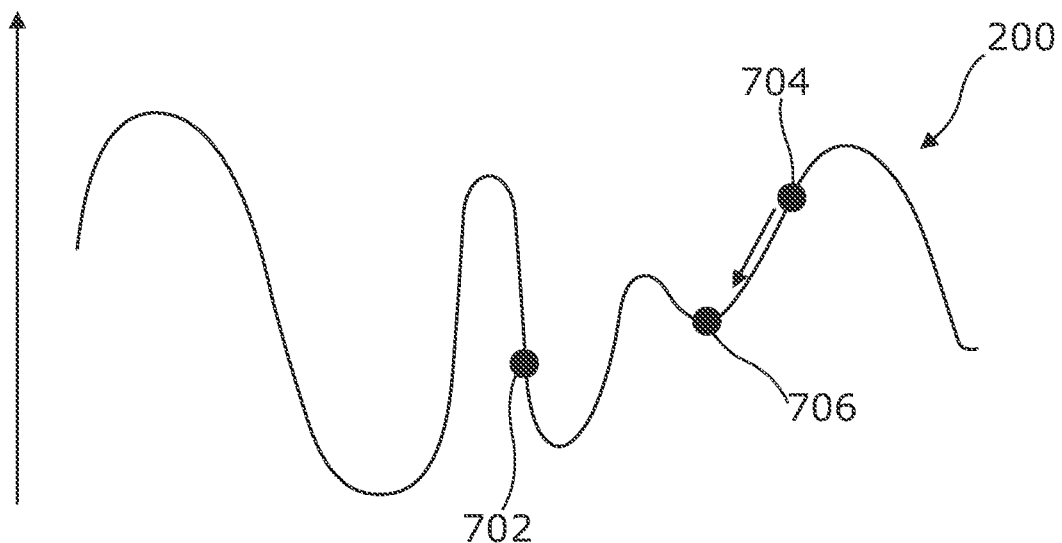
FIG. 11 is a graphical representation demonstrating a particular scenario with respect to the arbitrary function shown in FIG. 5.
Figure 12:
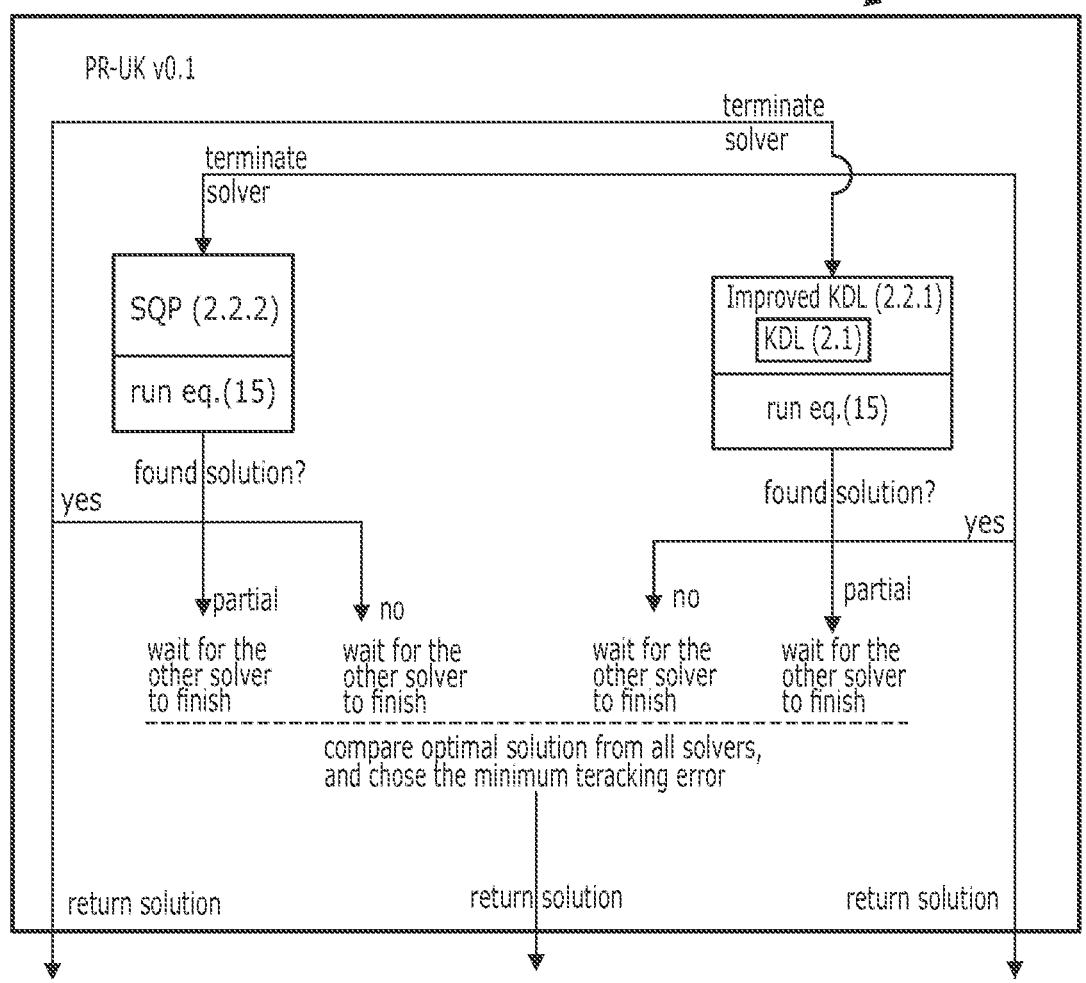
FIG. 12 is a schematic representation of an algorithm logic developed from the logic shown in FIG. 10.

Note that, in contrary to the state-of-the-art solution (14), the IK algorithm (15) chooses the best solution with respect to the current instrument pose (p) and not solver initial condition ($p_{init}$=f($q_{init}$)). That is to account for the random initial condition used in the TRAC-IK algorithm for which the local solution found could be further away from the desired pose than the current robotic instrument pose. An example of this scenario is demonstrated in FIG. 11 with respect to the arbitrary function 200 and a current instrument state 702. Based on a random initial condition 704, a local solution 706 would be found which corresponds to a robotic instrument pose worse than the current robotic instrument pose. Algorithm logic 800 for the second IK algorithm (15) is shown in FIG. 12.

This algorithm returns the best available solution even when no exact solution has been found, while the initial conditions ensure that the solution proposed by the algorithm is not worse than the current state of the robotic instrument. As a result, the robotic instrument remains responsive even when no perfect solution exists, e.g., the passive controller pose is outside of the instrument workspace.

Add Fictitious Velocity Limits to Prevent a Configuration Change

Figure 13:
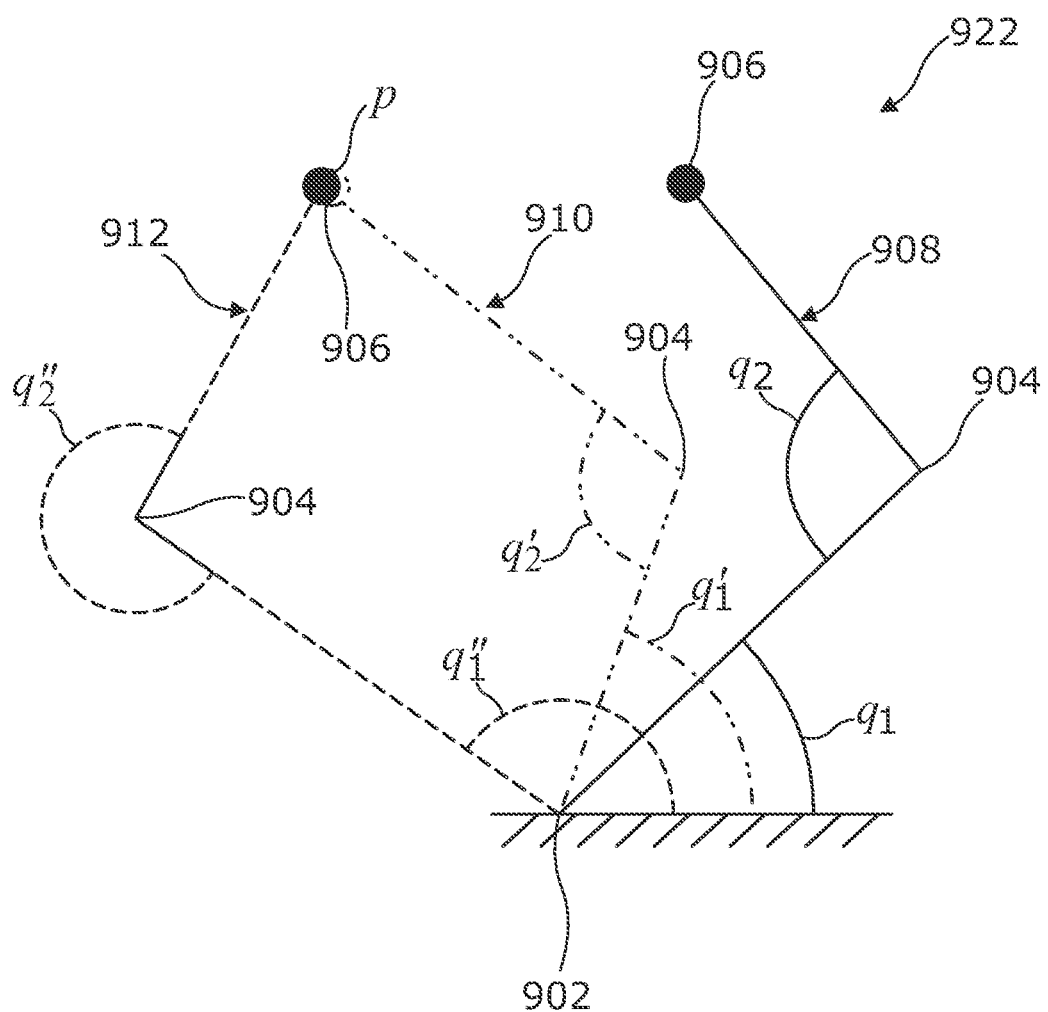
FIG. 13 is a schematic representation of a simple robotic instrument positioned in different configurations.

It is possible that for a given end effector pose, the robotic instrument may have more than one possible configuration. For example, FIG. 13 shows a simple robotic instrument 922 with a first joint 902, a second joint 904 and an end effector 906. In a current configuration 908, the first joint 902 is positioned at angle $q_1$ and the second joint 904 is positioned at angle $q_2$. However, for a desired end effector position p, two configurations are possible. In a first configuration 910 the first joint 902 would be positioned at angle $q'_1$ and the second joint 904 angle $q'_2$ 916. In a second configuration 912 the first joint 902 would be positioned at angle $q''_1$ and the second joint 904 would be positioned at angle $q''_2$.

When considering the two possible configurations, the positions of the end effector 906 are equivalent, i.e., $$p = p. \tag{16}$$

However, the amount of motion required from the mechanical joints to achieve this position is different, $$\sum_{\{i=0\}}^{\{i=2\}} |q_i - q''_i|^2 > \sum_{\{i=0\}}^{\{i=2\}} |q_i - q'_i|^2. \tag{17}$$

The amount of motion of the mechanical joints of the robotic instrument performed in a unit of time is referred to as the joint-space velocities.

In FIG. 13, movement of the robotic instrument—in a given amount of time—from the current configuration 908 to the second configuration 912 would require a significantly faster motion of the joints 902, 904 than moving from the current configuration 908 to the first configuration 910. As a result, if the second configuration were chosen, the instrument may seem to jump and the motion may feel unpredictable to a user. This is especially true when a large joint-space motion corresponds to a minor change in the position of the end-effector, and thus a minor motion of the passive controller executed by the user.

A standard approach to prevent configuration change (prevent the instrument from moving to the second configuration 912 rather than the first configuration 910) is to limit the allowed velocity of the robotic instrument's mechanical joints. These limits are referred to as joint-space velocity limits.

A known method of applying joint-space velocity limits is to solve the following (or equivalent) optimisation problem:

$$\min_{q^*} \quad (p_{ref} - f(q))^T (p_{ref} - f(q)) \tag{18}$$

$$\text{s.t.} \quad q^{min} \leq q^* \leq q^{max}$$
$$\quad \dot{q}^{min} \leq \dot{q}^* \leq \dot{q}^{max}$$

Similarly, to the previous case, this solution only accounts for the velocity limits near the algorithm initial conditions. Furthermore, it prevents an algorithm from finding the global solution as it enforces the velocity limits at each step. A commonly used alternative solution to account for the joint-space velocity limits reads:

$$\min_{q^*} \quad (p_{ref} - f(q^*))^T (p_{ref} - f(q^*)) + (q_{ref} - q^*)^T W(q_{ref} - q^*) \tag{19}$$

$$\text{s.t.} \quad q^{min} \leq q \leq q^{max}$$

where $W \in \mathfrak{R}^{n \times n}$ is a weighing matrix. This algorithm can find a broader range of solutions than (18), but the joint-space velocity limits are not strictly imposed. A solution that balances out required joint-space velocities and the end-effector tracking error is found by algorithm (19).

Rather than implementing the velocity limits at the local level, the algorithm described below utilises the local unconstrained IK algorithms and applies the velocity limits at the global level.

To address the instrument configuration change, the algorithm (15) has been extended to account for the velocity limits in a third IK algorithm (20). It reads

[1] $q_{init} = q$
[2] $(p^*, q^*) = (p, q)$
[3] $(\bar{p}^*, \bar{q}^*) = (p, q)$
[4] while $t < t_{max}$ and $\|p_{ref} - p^*\| > \varepsilon$:
[5]   $q_i$ = start local algorithm $(q_{init}, p_{ref})$
[6]   while local algorithm is running:
[7]     $q_i$ = step local algorithm $(q_{init}, p_{ref})$

[8]   $(p^*, q^*) = \begin{cases} (p_i, q_i) & \text{if } \|p_{ref} - p_i\| < \|p_{ref} - p^*\| \\ (p^*, q^*) & \text{otherwise} \end{cases}$  (20)

[9]   $(\bar{p}^*, \bar{q}^*) = \begin{cases} (p_i, q_i) & \text{if } \|p_{ref} - p_i\| < \|p_{ref} - p^*\| \text{ \&} \\ & \forall k \in \{0, \ldots, n\}: \|\dot{q}_k\| < \dot{q}_k^{max} \\ (\bar{p}^*, \bar{q}^*) & \text{otherwise} \end{cases}$

[10] choose new random $q_{init}$ where $(\bar{.})$ marks variables that lie within velocity limits. The 'local algorithm' refers to any algorithm that computes local solutions. In (20), [1], [2] and [3] represent the initialisation phase. After initialisation, the iterative loop [4]-[10] is executed until a terminal condition is met. Inside the loop [4]-[10], an internal iterative loop [6]-[9] of an algorithm to compute local solutions is run where partially constrained solutions (feasible within predefined position limits) and constrained solutions (feasible within both predefined position limits and predefined velocity limits) are updated at each iteration. In other words, the third IK algorithm (20) is configured to apply the predefined position and velocity limits separately to enable the calculation of both constrained and partially constrained poses of the end effector.

Figure 14:
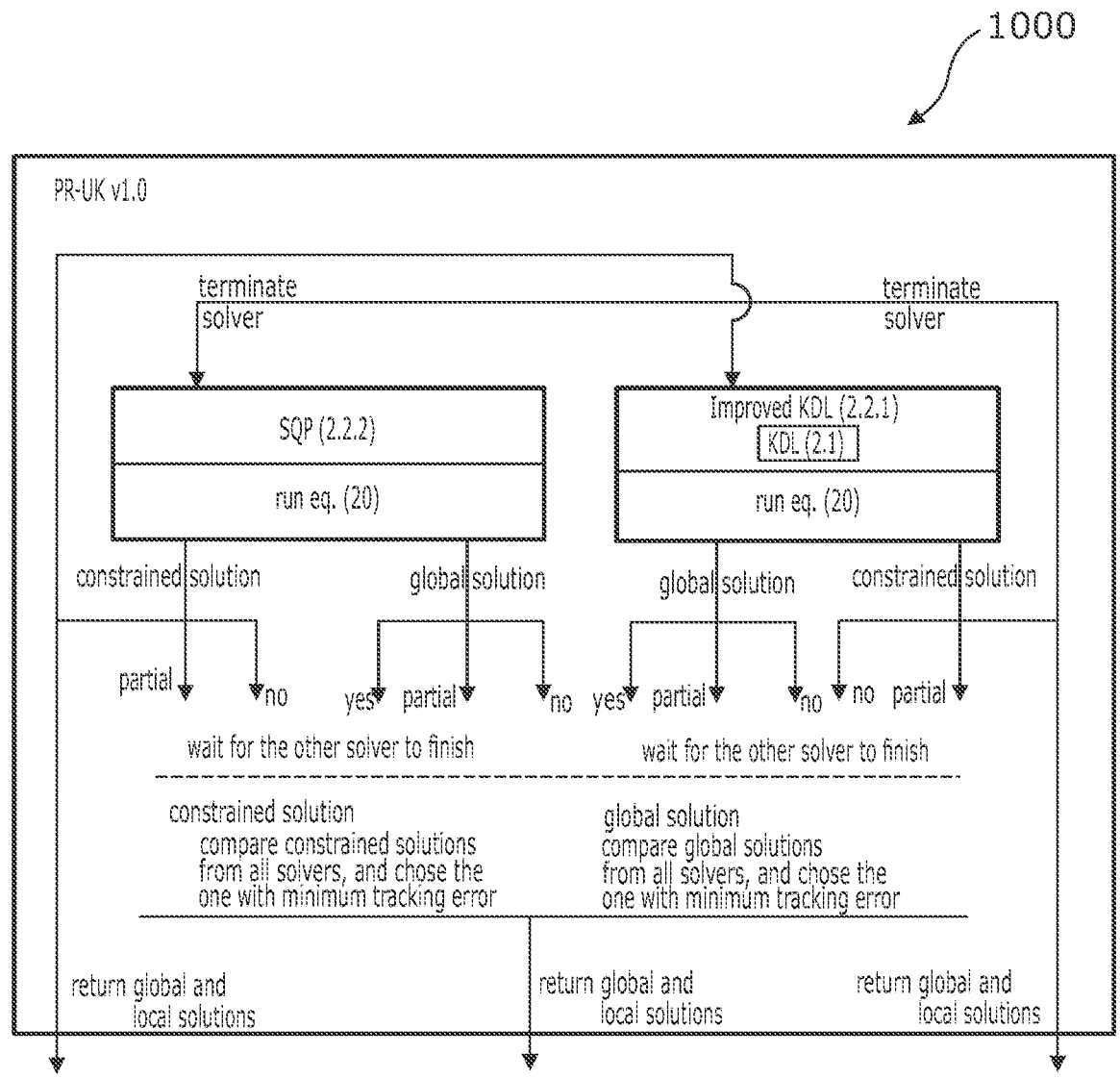
FIG. 14 is a schematic representation of an algorithm logic developed from the logic shown in FIG. 12.

An algorithm to compute local solutions is referred to as a 'local algorithm' in the remainder of this document. The local algorithm may be any suitable algorithm to compute local solutions, such as the Kinematics and Dynamics Library solver, the Improved Kinematics and Dynamics Library solver and the Sequential Quadratic Programming solver. Further, two or more solvers may run concurrently such that the solver which identifies the global solution first terminates the other solvers, as shown by the algorithm logic 1000 shown in FIG. 14.

The initialisation phase starts by setting local algorithm initial conditions to the current instrument state [1]. Then, partially constrained [2] and constrained [3] solutions are initially set-up to the current instrument state to ensure final solutions generated by (20) are not worse than the current state.

In [4], an iterative loop starts; it ends when the maximum time limit is crossed or a solution that satisfies a terminal constraint is found. A terminal constraint indicates an algorithm expected accuracy, i.e., the maximum tracking error between a desired state and a current solution ($\varepsilon$) for a solution to be considered exact. This is required to account for a numerical accuracy of digital computations, practical precision of an instrument and to ensure a finite convergence time.

At the beginning of a first iteration of loop [4]-[10], a local algorithm is started with a current initial state [5]. At each step of a local algorithm [6]-[9], a current solution found is compared independently with stored partially constrained (in [8]) and constrained (in [9]) solutions. If the current solution is more optimal than the stored value, and constraints are satisfied for the constrained solution, the stored value is updated to the new value. Known approaches apply velocity limits in the same manner as position limits. However, in embodiments of the invention, velocity limits are checked at each iteration of a local algorithm, but a local algorithm is not terminated when velocity limits are crossed. This approach allows an algorithm to find a partially constrained solution (satisfying the position limits but not necessarily the velocity limits) in addition to a constrained one (satisfying both sets of limits). Hence, the third IK algorithm applies the predefined position and velocity limits separately to enable the calculation of both constrained ($\bar{p}^*$) and partially constrained ($p^*$) poses of the end effector.

Finally, when the local algorithm terminates, new initial conditions are randomly generated, and a new iteration of the loop [4]-[10] starts with the local algorithm initialised with new initial conditions. Note, the first iteration of the third IK algorithm (20) will always find a local solution for a current state, because the local algorithm's initial conditions match the current state. Only when no solution has been found locally does the algorithm (20) start looking for a global solution by changing the local algorithm's initial conditions. The third IK algorithm (20) is re-run until the maximum time has been reached or a solution that satisfies the terminal constraint has been found, i.e., the terminal condition has been met. In other words, the calculating and comparing steps [5]-[9] are reiterated until a predefined time limit has expired or until a predefined terminal constraint has been satisfied [4].

Overall, the third IK algorithm (20) is a global optimisation algorithm. If the third IK algorithm (20) terminates through the terminal constraint [4], the returned constrained and partially constrained solutions are globally optimal. If (20) terminates due to the time limit, no claim can be made on the global optimality of a provided constrained solution. However, when (20) terminates due to the time limit, global optimality of a partially constrained solution can be checked by applying terminal constraint [4] to the partially constrained solution. If a tracking error in [4] for the partially constrained solution is below a given threshold, the partially constrained solution can be considered to be globally optimal, otherwise no claim can be made on its global optimality.

This approach provides both constrained and partially constrained solutions, and it supports random shooting of the initial conditions for the local algorithms. The constrained solution is applied by default whereas the partially constrained solution is used to unlock the instrument motion if it has been frozen due to the velocity limits, as described further below.

Provide an Unlock Action

With introduction of the velocity limits, the robotic instrument may freeze when motion of the passive controller maps to the robotic instrument motion faster than the maximum joint-space velocity limits. An IK algorithm may also prevent the instrument motion if the instrument is in the local minimum, even though better solutions may exist for a different kinematic configuration of an instrument. Additionally, the surgeon may decide that the instrument in a given kinematic configuration feels out-of-control due to the system restricting the allowed instrument poses with the velocity limits. To counteract these effects, the passive controller comprises an unlock mechanism configured to reinstate tracking of the robotic instrument pose to the passive controller pose following a tracking interruption.

In embodiments of the invention, the unlock mechanism may be activated and de-activated by pressing and releasing, respectively, a pedal control 16 operatively coupled to the passive controller 12 as shown in FIG. 1. In other embodiments of the invention the passive controller may comprise any suitable means for the user to activate the unlock mechanism such as a button, trigger, lever or voice command system for example.

Activation of the unlock mechanism causes the apparatus to determine whether a constrained pose identified as a constrained global solution matches a partially constrained pose identified as a partially constrained global solution. If the constrained and partially constrained poses do not match, the apparatus will generate a motor command according to the partially constrained global solution. In other words, activation of the unlock mechanism causes the apparatus to check if the robotic instrument's current constrained pose is equivalent to a partially constrained pose identified as a partially constrained global solution, i.e. the best available solution within the position limits of the robotic instrument. If not, the apparatus will move the robotic instrument to the partially constrained pose.

However, it is possible, if not probable, that the partially constrained pose does not satisfy the velocity constraints of the robotic instrument. In which case, the apparatus is configured to determine, using a trajectory algorithm, a trajectory of movement for the robotic instrument within the instrument workspace such that the end effector moves from the current pose to the partially constrained pose within the predefined velocity limit. The apparatus will then generate the motor command to automatically control movement of the robotic instrument according to the determined trajectory.

In embodiments of the invention the apparatus will check if the current, constrained, robotic instrument pose is globally optimal, i.e., it checks if the global unconstrained solution ($p^*$ in (20)) matches the constrained solution ($\bar{p}^*$ in (20)). This check is performed up to a maximum number of times, such as 10 for example. The number of repetitions is decreased from the maximum only when a valid solution has been found by the IK algorithm. If within this limit, the unconstrained and constrained solutions always match, the apparatus returns to normal operation, i.e., the unlock mechanism terminates. When the constrained and unconstrained solutions do not match, i.e., $p^* \neq \bar{p}^*$, the unconstrained solution is applied. To avoid sudden, unexpected motions of the instrument when the unconstrained solution is used, the trajectory of the robotic instrument is determined using the trajectory algorithm which ensures the robotic instrument moves within the predefined velocity limits. Once the current robotic instrument pose matches the desired pose, the apparatus returns to normal operation.

It is possible that the user may move the passive controller while the unlock mechanism is activated, i.e. while the robotic instrument is moving automatically to the partially constrained pose. To ensure that the final pose of the robotic instrument tracks the current passive controller pose as accurately as possible, the apparatus is configured to redetermine the trajectory of movement as the pose of the passive controller changes.

Trajectory Algorithm

A trajectory algorithm used by embodiments of the invention is described below.

To set an instrument to an arbitrary state that does not lie within the instrument velocity limits, a trajectory algorithm has been introduced to move the robotic instrument from its current state q to a desired state $q^*$. It reads

[1] $k_L = 1$
[2] $\forall_{k \in \{0, \ldots, n\}}$:
[3] $\quad \Delta q_k^* = (q_k^* - q_k)\sin(k_\omega t)$

[4] $\quad s = \dfrac{k_s \Delta q_{k,max}}{\|\Delta q_k^*\| + \varepsilon}$

[5] if $s < k_L \Delta$: $\rightarrow k_L = s$
[6] $\quad q_u = q + k_L \Delta q^*$
[7] if $k_L = 1 :\rightarrow t = t + \Delta t$
[8] if $k_L = 1$ and $\Sigma_{k=1}^n (q_k^* - q_k) < k_t :\rightarrow$ terminate    (21)

where $k_L \in \Re^+$ represent a global scaling factor to ensure the generated trajectory lies within the joint space velocity limits, $k_s \in \Re^+$ stands for a user-defined scaling factor to slow down the movement to a velocity below the predefined velocity limit, $k_t \in \Re^+$ is a terminal constraint threshold to finish trajectory, and $q_u$ is the current control command.

The trajectory algorithm (21) starts by setting up the global scaling factor $k_L$ to one [1]. This value represents a situation where no trajectory scaling is performed. Then, for each instrument joint [2], the new step in the trajectory is generated based on the current $(q_k)$ and desired $(q^*_k)$ state [3]. In [4], a scaling factor for a current joint is computed based on the displacement required to follow the trajectory $(\Delta q^*_k)$ and the joint velocity limits represented by the maximum joint displacement $(\Delta q_{k,max})$. The global scaling factor is computed to ensure that the movement of the robotic instrument does not exceed the predefined velocity limit. If the scaling factor computed for a current joint(s) is smaller than the current global scaling factor $(k_L)$, i.e., the trajectory has to be slowed down more than for the previous joints, the global scaling factor $(k_L)$ is updated [5].

In computation of [4], an additional user-defined scaling factor $(k_s)$ may be introduced. It is an optional constant value defined by the user of the algorithm at its initialisation. It allows the user to slow down the instrument motion to below the predefined velocity limit. This value is useful to slow down the automatic robotic instrument motion to a speed at which the instrument motion can be monitored more easily by a human. When the trajectory update is computed, the global scaling factor $(k_L)$ is applied to all of the joints [6]. This is to ensure that the trajectory will finish for all joints at the same moment, which results in a more consistent motion.

When the final trajectory step is applied, the trajectory time is updated provided that no scaling was required [7]. The trajectory [3] is generated so the final point is reached at most at $$k_\omega t = \frac{\pi}{2} \Rightarrow \sin(k_\omega t) = 1.$$

If this point is crossed, the trajectory will start to slow down or, when $k_\omega t \in (\pi; 3/2\pi) \Rightarrow \sin(k\omega t) < 0$, it will move the instrument back towards the initial position. The condition $(k_\omega t \leq \pi/2)$ is implicitly satisfied when no global scaling factor is applied and the desired state $q^*$ is constant. To ensure the condition $(k_\omega t \leq \pi/2)$ is not being violated when the scaling factor is applied or the desired state $q^*$ is updated during the motion generation, the trajectory generator progression indicated by t is not moved forward if the joint scaling was required [7].

In the last step, the terminal conditions are checked [8]. The trajectory is considered to be finished when no scaling was applied to the generated trajectory, and all of the joints have reached their desired position up to a given threshold ($k_t$). The terminal constraint threshold ($k_t$) is a constant parameter that allows the algorithm to finish in a finite time. It accounts for the numerical accuracy, the algorithm time step and precision of the controlled instrument.

As the robotic instrument is being automatically controlled, the trajectory algorithm (21) generates commands to safely move the instrument from the current state (q) to the desired state (q*). The generated commands are sent to the motors. The algorithm finishes automatically when the current state reaches the desired one ($\|q-q^*\| \le \varepsilon$). Alternatively, it terminates immediately when the surgeon deactivates the unlock mechanism via operation of the passive controller.

The desired joint-space state (q*) can be safely updated during the trajectory generation; the trajectory algorithm design ensures safe joint-space motion in such cases.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. An apparatus comprising:
   at least one processor; and
   at least one memory including computer program code, the at least one memory and computer program code configured to, with the at least one processor, cause the apparatus to:
   receive a control command from a passive controller, the passive controller configured to remotely control a robotic instrument having a plurality of joints and an end effector, the control command defining a desired pose of the end effector, wherein the passive controller and robotic instrument have freedom of movement within respective control and instrument workspaces, and wherein the control workspace is mapped to the instrument workspace to allow the pose of the robotic instrument to track the pose of the passive controller as the passive controller moves within the control workspace;
   determine, based on the control command, a global solution of joint parameters for each of the plurality of joints using an inverse kinematics algorithm to enable the end effector to mimic the desired pose as closely as possible within the instrument workspace, wherein the inverse kinematics algorithm is configured to:
   determine one or more position limits of the robotic instrument within the instrument workspace to define one or more position constraints;
   calculate an initial tracking error based on the one or more position constraints, a current pose of the end effector, and the desired pose using a first set of joint parameters;
   calculate a plurality of tracking errors based on the one or more position constraints, the current pose of the end effector, and the desired pose using a plurality of sets of joint parameters different from the first set of joint parameters;
   identify the set of joint parameters associated with the smallest tracking error as the global solution only if the smallest tracking error is smaller than the initial tracking error, otherwise identify the first set of joint parameters as the global solution; and
   wherein the apparatus is further configured to generate a motor command to reconfigure the plurality of joints according to the set of joint parameters associated with the global solution if the smallest tracking error is identified as the global solution.

2. The apparatus of claim 1, wherein the plurality of sets of joint parameters different from the first set of joint parameters are randomly chosen.

3. The apparatus of claim 1, wherein the inverse kinematics algorithm is configured to calculate the plurality of tracking errors until a predefined time limit has expired or until a predefined terminal constraint has been satisfied.

4. The apparatus of claim 1, wherein the inverse kinematics algorithm further includes a predefined velocity limit to enable the calculation of constrained poses of the end effector that satisfy velocity constraints of the robotic instrument.

5. The apparatus of claim 4, wherein the inverse kinematics algorithm has the form:

$$\begin{aligned}
&q_{init} = q \\
&(p^*, q^*) = (p, q) \\
&\text{while } t < t_{max} \text{ and } \|p_{ref} - p^*\| > \varepsilon: \\
&\quad q_i = \text{solver}(q_{init}, p_{ref}) \\
&\quad (p^*, q^*) = \begin{cases} (p_i, q_i) & \text{if } \|p_{ref} - p_i\| < \|p_{ref} - p^*\| \\ (p^*, q^*) & \text{otherwise} \end{cases} \\
&\quad \text{choose new random } q_{init}.
\end{aligned}$$

where $p_{ref} \in \Re^6$ represents the desired end effector pose as received from the passive controller, $p_i = f(q_i) \in \Re^6$ stands for the end effector pose as computed by the current iteration of the algorithm, $q_{init} \in \Re^6$ denotes the algorithm initial condition, where $p=f(q) \in \Re^6$ is an end effector pose computed based on the current state of the robotic instrument or last joint-space command sent to motors driving the robotic instrument if no joint angle sensor feedback is available, $p^* = f(q^*) \in \Re^6$ represents current control candidate and $\varepsilon \in \Re^1$ denotes the accepted algorithm tolerance; $t \in \Re^1$ and $t_{max} \in \Re^1$ represent current and maximum time the algorithm can run.

6. The apparatus of claim 5, wherein the inverse kinematics algorithm has the form:

$$\begin{aligned}
&q_{init} = q \\
&(p^*, q^*) = (p, q) \\
&(\bar{p}^*, \bar{q}^*) = (p, q) \\
&\text{while } t < t_{max} \text{ and } \|p_{ref} - p^*\| > \varepsilon: \\
&\quad q_i = \text{start local algorithm}(q_{init}, p_{ref}) \\
&\quad \text{while local algorithm is running:} \\
&\quad\quad q_i = \text{step local algorithm}(q_{init}, p_{ref})
\end{aligned}$$

-continued $$(p^*, q^*) = \begin{cases} (p_i, q_i) & \text{if } \|p_{ref} - p_i\| < \|p_{ref} - p^*\| \\ (p^*, q^*) & \text{otherwise} \end{cases}$$

$$(\overline{p}^*, \overline{q}^*) = \begin{cases} (p_i, q_i) & \text{if } \|p_{ref} - p_i\| < \|p_{ref} - p^*\| \ \& \\ & \forall k \in \{0, \ldots, n\}: \|\dot{q}_k\| < \dot{q}_k^{max} \\ (\overline{p}^*, \overline{q}^*) & \text{otherwise} \end{cases}$$

choose new random $q_{init}$ where (.) marks variables that lie within velocity limits and the 'local algorithm' refers to any algorithm that computes local solutions.

7. The apparatus of claim 1, wherein the passive controller comprises an unlock mechanism configured to reinstate tracking of the robotic instrument pose to the passive controller pose following a tracking interruption.

8. The apparatus of claim 1, wherein, the apparatus is configured to:

determine, using a trajectory algorithm, a trajectory of movement for the robotic instrument within the instrument workspace such that the end effector moves from the current pose to the desired pose within a predefined velocity limit.

9. The apparatus of claim 8, wherein the apparatus is configured to redetermine the trajectory of movement as the pose of the passive controller changes.

10. The apparatus of claim 8, wherein the trajectory algorithm comprises a global scaling factor which is computed to ensure that the movement of the robotic instrument does not exceed the predefined velocity limit.

11. The apparatus of claim 10, wherein the trajectory algorithm comprises a user-defined scaling factor to slow the movement of the robotic instrument to below the predefined velocity limit.

12. The apparatus of claim 11, wherein the trajectory algorithm has the form:

$$k_L = 1$$
$$\forall_{k \in \{0, \ldots, n\}}:$$
$$\Delta q_k^* = (q_k^* - q_k)\sin(k_\omega t)$$
$$s = \frac{k_s \Delta q_{k,max}}{\|\Delta q_k^*\| + \varepsilon}$$
$$\text{if } s < k_L \Delta: \rightarrow k_L = s$$
$$q_u = q + k_L \Delta q^*$$
$$\text{if } k_L = 1 :\rightarrow t = t + \Delta t$$
$$\text{if } k_L = 1 \text{ and } \Sigma_{k=1}^n (q_k^* - q_k) < k_t :\rightarrow \text{terminate}$$

where $k_L \in \Re^+$ represent a global scaling factor to ensure the generated trajectory lies within the joint space velocity limits, $k_s \in \Re^+$ stands for a user-defined scaling factor to slow down the movement to a velocity below the predefined velocity limit, and $k_t \in \Re^+$ is a terminal constraint threshold to finish trajectory.

13. The apparatus of claim 1, wherein the inverse kinematics algorithm comprises one or more of the Kinematics and Dynamics Library solver, the Improved Kinematics and Dynamics Library solver and the Sequential Quadratic Programming solver.

14. The apparatus of claim 1, wherein the inverse kinematics algorithm comprises two or more solvers running concurrently such that the solver which identifies the global solution first terminates the other solvers.

15. The apparatus of claim 1, wherein the joint parameters for each of the plurality of joints comprise one or more of the position, angle, orientation, configuration and velocity of the joint.

16. The apparatus of claim 1, wherein the robotic instrument is a surgical robot.

17. The apparatus of claim 1, wherein the apparatus comprises at least one of: the passive controller and robotic instrument.

18. A computer-implemented method comprising:

receiving a control command from a passive controller, the passive controller configured to remotely control a robotic instrument having a plurality of joints and an end effector, the control command defining a desired pose of the end effector, wherein the passive controller and robotic instrument have freedom of movement within respective control and instrument workspaces, and wherein the control workspace is mapped to the instrument workspace to allow the pose of the robotic instrument to track the pose of the passive controller as the passive controller moves within the control workspace;

determining, based on the control command, a global solution of joint parameters for each of the plurality of joints using an inverse kinematics algorithm to enable the end effector to mimic the desired pose as closely as possible within the instrument workspace, wherein the inverse kinematics algorithm is configured to:

determine one or more position limits of the robotic instrument within the instrument workspace to define one or more position constraints;

calculate an initial tracking error based on the one or more position constraints, a current pose of the end effector, and the desired pose using a first set of joint parameters;

calculate a plurality of tracking errors based on the one or more position constraints, the current pose of the end effector, and the desired pose using a plurality of sets of joint parameters different from the first set of joint parameters;

identify the set of joint parameters associated with the smallest tracking error as the global solution only if the smallest tracking error is smaller than the initial tracking error, otherwise identify the first set of joint parameters as the global solution; and wherein the method further comprises generating a motor command to reconfigure the plurality of joints according to the set of joint parameters associated with the global solution if the smallest tracking error is identified as the global solution.

\* \* \* \* \*